United States Patent
Sundell et al.

(10) Patent No.: US 12,118,864 B2
(45) Date of Patent: Oct. 15, 2024

(54) SECURITY DEVICE ZONES

(71) Applicant: SimpliSafe, Inc., Boston, MA (US)

(72) Inventors: Dan Sundell, Boston, MA (US); Jordan Thayer, Boston, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 18/447,843

(22) Filed: Aug. 10, 2023

(65) Prior Publication Data
US 2024/0071192 A1    Feb. 29, 2024

Related U.S. Application Data

(60) Provisional application No. 63/374,068, filed on Aug. 31, 2022.

(51) Int. Cl.
| | | |
|---|---|---|
| G08B 13/19 | (2006.01) | |
| G06V 10/26 | (2022.01) | |
| G06V 20/52 | (2022.01) | |
| G08B 13/196 | (2006.01) | |

(52) U.S. Cl.
CPC ......... *G08B 13/1968* (2013.01); *G06V 10/26* (2022.01); *G06V 20/52* (2022.01); *G08B 13/19656* (2013.01); *G08B 13/19682* (2013.01); *G08B 13/19686* (2013.01)

(58) Field of Classification Search
USPC ....................................................... 348/159
See application file for complete search history.

(56) References Cited

U.S. PATENT DOCUMENTS

| | | | | |
|---|---|---|---|---|
| 7,366,359 | B1* | 4/2008 | Davey | G06V 10/22 |
| | | | | 346/143 |
| 9,864,372 | B2* | 1/2018 | Chen | H04L 67/125 |
| 2014/0288976 | A1* | 9/2014 | Thomas | G06Q 40/08 |
| | | | | 345/443 |
| 2020/0117905 | A1* | 4/2020 | Yakupov | G06V 20/48 |
| 2023/0154296 | A1 | 5/2023 | Jacob | |

FOREIGN PATENT DOCUMENTS

| | | |
|---|---|---|
| EP | 2741237 A1 | 6/2014 |
| JP | 2018-007150 A | 1/2018 |

OTHER PUBLICATIONS

Communication Relating to the Results of the Partial International Search and Provisional Opinion Accompanying the Partial Search Result, PCT Application PCT/US2023/073064 (9 pages) (mailed Dec. 12, 2023).

\* cited by examiner

*Primary Examiner* — Mikhail Itskovich
(74) *Attorney, Agent, or Firm* — Finch & Maloney PLLC

(57) ABSTRACT

A method is provided. The method includes receiving, from a monitor interface implemented by a first computing device, input specifying a zone within a field of view of an image capture device; storing, in response to reception of the input, a record defining the zone; receiving, from the image capture device, an image acquired within the field of view by the image capture device; and rendering, via a customer interface implemented by a second computing device distinct from the first computing device, the image with a representation of the zone overlaid upon the image.

20 Claims, 12 Drawing Sheets

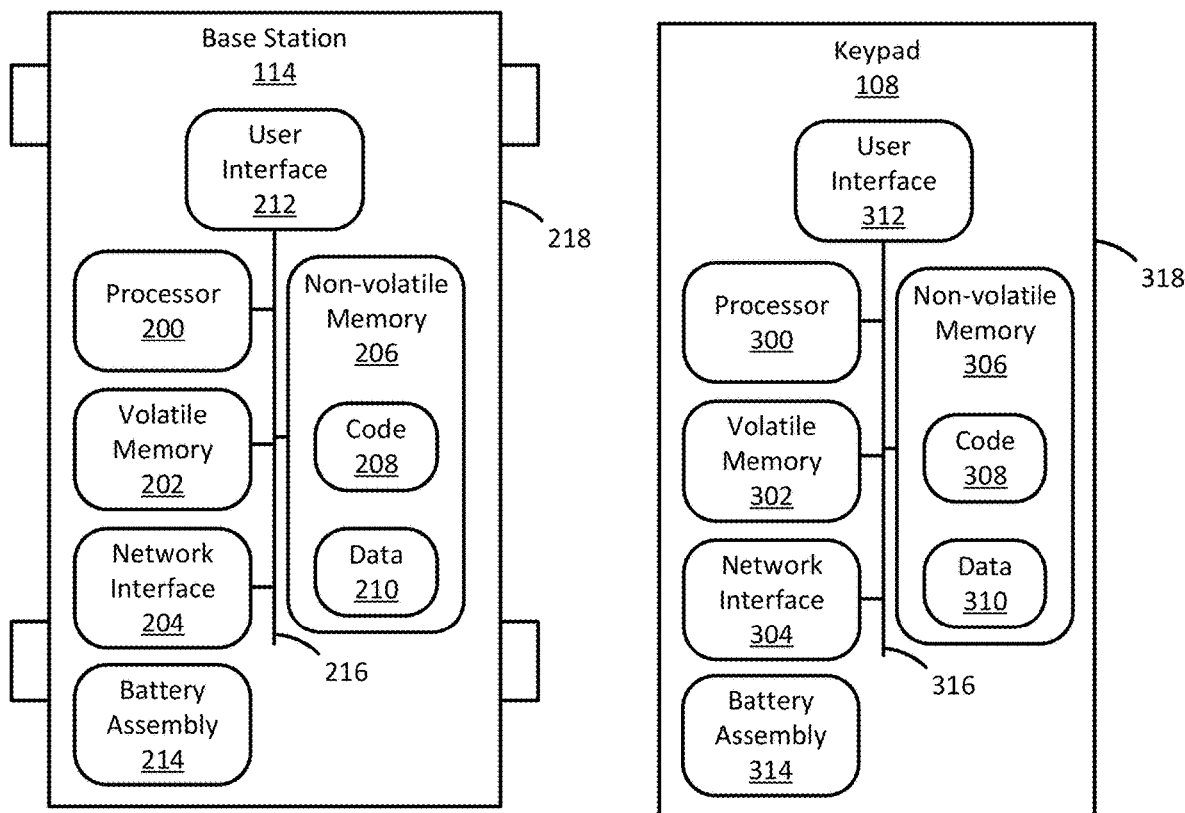

SECURITY DEVICE ZONES

RELATED APPLICATIONS

This application claims priority under 35 U.S.C. § 119(e) to U.S. Provisional Application Ser. No. 63/374,068, titled "SECURITY DEVICE ZONES," filed Aug. 31, 2022, which is hereby incorporated herein by reference in its entirety.

TECHNICAL FIELD

Aspects of the technologies described herein relate to security systems and methods.

BACKGROUND

Some monitoring systems use one or more cameras to capture images of areas around or within a secured location, such as a residence or business location. Such monitoring systems can process images locally and transmit the captured images to a remote service. If motion is detected, the monitoring systems can send an alert to one or more user devices.

SUMMARY

In an example, a method is provided. The method includes receiving, from a monitor interface implemented by a first computing device, input specifying a zone within a field of view of an image capture device; storing, in response to reception of the input, a record defining the zone; receiving, from the image capture device, an image acquired within the field of view by the image capture device; and rendering, via a customer interface implemented by a second computing device distinct from the first computing device, the image with a representation of the zone overlaid upon the image.

The method can incorporate one or more of the following features.

In the method, receiving input specifying the zone can include communicating information about the zone over a private network within a monitoring center, and communicating the information about the zone over a public network connected to the private network; and rendering the image with a representation of the zone can include communicating the information about the zone over the public network to the second computing device. The information about the zone can specify a description of the zone. The information about the zone can specify that the zone has an irregular polygonal shape.

The method can further include receiving input, via the customer interface, requesting that the zone be stored as a customer zone. In the method, the zone can be a filter zone and the method can further include communicating the information about the zone to the image capture device. The method can further include redacting, by the image capture device, image data from an acquired image, the image data falling within the zone. The method can further include rendering a representation of a non-filter zone in conjunction with the redacted image data. In the method, the first computing device can be coupled to a private network of a monitoring center, the monitor interface can be a first instance of the monitor interface, and the method can further include rendering the representation of the zone on the first instance of the monitor interface; and rendering the representation of the zone on a second instance of the monitor interface implemented by a third computing device coupled with the private network.

In an example, a method is provided. The method includes acquiring, by an image capture device, an image within a field of view of the image capture device; identifying, within the image, one or more objects; recommending, via a customer interface, a zone that covers the one or more objects; receiving input, via the customer interface, requesting that the zone be stored as a customer zone; and rendering, via a monitor interface implemented by a computing device coupled with a private network within a monitoring center, a representation of the customer zone overlaid upon the image.

The method can incorporate one or more of the following features.

In the method, the image can be a first image and the method can further include acquiring, by the image capture device, a second image within the field of view of the image capture device; identifying the one or more objects within the second image; and calculating at least one metric that indicates an amount of change between the first image and the second image with reference to at least one of the customer zone and the one or more objects. The method can further include determining whether the field of view of the image capture device has been relocated using the at least one metric. The method can further include determining whether the image capture device has been tampered with using the at least one metric. The method can further include adjusting information about the zone to generate adjusted information about the zone in response to a determination that the image capture device has been relocated. The method can further include rendering the adjusted information in the customer interface for approval. The method can further include determining a threat score with reference to the customer zone. The method can further include identifying the one or more objects comprises identifying one or more immobile objects using semantic segmentation.

In an example, one or more non-transitory computer-readable media are provided. The media store instructions executable by at least one processor of a computing device to execute any of the methods described above in this summary.

In an example, a system of computing devices is provided. The system includes one or more processors; and the one or more non-transitory computer-readable media described in the preceding paragraph.

Various examples described herein provide technological advantages over other systems in terms of processing efficiency, processing speed, and/or network latency. For example, the techniques described herein enable a camera and/or system to transmit only portions of images positioned within zones to a processing device (e.g., a server or cloud) for analysis. In comparison to processing whole images, this differential approach improves processing efficiency, network latency, and processing speed. Other advantages of the various examples described herein include an easy-to-use tool, e.g., a user interface, that allows users to define zones within a field of view of a camera and to submit the zones to other users for approval and/or use. These and other techniques for processing zones are described further below.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

FIG. 2 is a schematic diagram of a base station, according to some examples described herein.

FIG. 3 is a schematic diagram of a keypad, according to some examples described herein.

DETAILED DESCRIPTION

Figure 1:
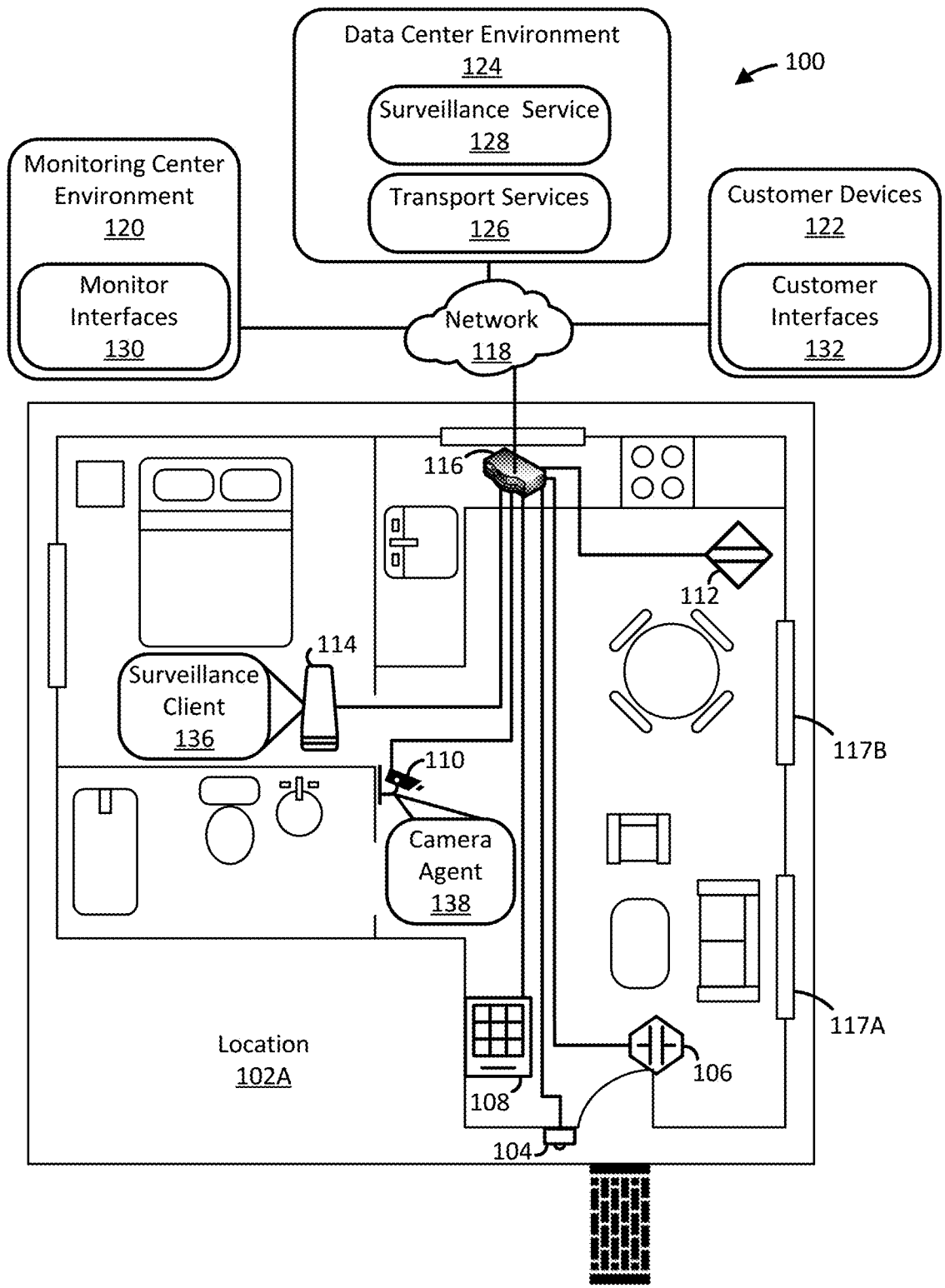
FIG. 1 is a schematic diagram of a security system, according to some examples described herein.

As summarized above, at least some examples disclosed herein are directed to systems and processes that implement zones within security systems. In some examples, a zone is a defined region overlaid on a field of view (FOV) of an image capture device, such as a camera, that is identified distinctly from other regions within the FOV. For instance, in some examples directed to processing images from a security camera, a zone is recorded as a data structure including one or more fields allocated to hold data specifying pixels included within the zone. For instance, in at least one example, the data stored in a zone enumerates identified pixels using cartesian coordinates that specify locations within a frame of the image data. In another example, the data stored in a zone specifies pixel-based dimensions and positions of one or more shapes relative to a reference pixel within a frame of the image data. In still another example, the data stored in a zone specifies pixels to be redacted, rather than included, within the zone (e.g., where storing data to be redacted is more efficient than storing data to be included). In addition to including fields specifying geometric boundaries of regions within a FOV that constitute a zone, the zone data structure can include one or more fields allocated to hold data specifying a name of the zone, a description of the zone, notes regarding the zone, whether the zone is to redact the image data it encompasses from certain subsequent processes (e.g., whether the zone is a filter zone), and an approval status of the zone. Examples of filter zones can include regions within an image that capture areas that are not a part of the customer's monitored location. Other forms and attributes of zones will be apparent in view of this disclosure. It should be noted that zones may be associated with a single frame or multiple frames of image data.

Zones provide for a number of advantages within security systems. For instance, zones enable users of the security system (e.g., customers, monitoring personnel, etc.) to share information specific to an identified region within an FOV at a monitored location. This increased context can aid users in determining whether action is needed to protect the monitored location when an event is detected. In addition, zones can be used as filters to reduce the amount of image data processed by a security system. When properly positioned and maintained, filter zones introduce a variety of benefits including decreased consumption of computing resources (e.g., computer vision (CV) and artificial intelligence (AI) processes) and fewer spurious notifications to users. These and other benefits of zones focus the resources and users of the security system on information that is more likely to be actionable, thereby increasing the value provided by the security system.

Despite the advantages offered by zones, impediments to their successful, wide-spread adoption remain. These impediments include a lack of user understanding of zone purpose and benefits, time required to create and maintain zones, an inability to create precise and accurate zone geometries, and process inaccuracies in determining whether an object recognized in a FOV resides within a zone. At least some of these impediments are due to design inefficiencies within user interfaces used to configure zones. For instance, some zone configuration interfaces are rendered via user interfaces programmed for customers rather than monitoring personnel, despite the fact that monitoring personnel are more familiar with the purpose and benefits of zones within security systems. In addition, some zone configuration interfaces require zones to be made up of one or more (and often several) rectangular bounding boxes. This constraint can force a user to devote excessive time to creation and maintenance of zones where a region within an FOV is not rectangular in shape. In such instances, many bounding boxes may be required to completely establish a zone. Moreover, the need to draw many boxes can result in discontinuities in zone boundaries. Discontinuous zone boundaries can precipitate processing errors and/or decrease confidence in CV/AI processes where such processes are used to determine whether an object within a FOV resides within or outside of a zone (e.g., where zone boundaries overlap or partially overlap with objects within an FOV).

To address these impediments, certain of the systems and processes described herein implement one or more programs that control a host device to render one or more zone GUIs. These zone GUIs are configured to interact with users to set up, share, and approve of zones within a security system. In some examples, the GUIs include controls configured to receive input specifying one or more pre-sized boxes to overlay a region of the FOV. Such pre-sized boxes can increase the accuracy of system processes in recognizing whether an object within the FOV is within a zone. Additionally or alternatively, in some examples, the zone GUIs include controls configured to receive input specifying one or more shapes of any size or dimension to overlay one or more regions of the FOV. In these examples, the zone GUIs can receive input specifying nuanced zones with geometries that more accurately define a region within the FOV. In some examples, once a zone is established by monitoring personnel or a customer, the zone may be accessed by other monitoring personnel. In this way, monitoring personnel can utilize zones to share information that is relevant to a monitored location.

Further, in some examples, zone GUIs rendered by the systems and processes described herein are configured to receive input from customers of the security system that approves of zones created without customer involvement. For instance, in these examples, the zones can be created by interactions between the security system and monitoring personnel. Alternatively or additionally, in these examples, the zones can be created autonomously by the security system (e.g., based on image history) as is described in U.S. Patent Application Publication Number 2023/0154296 A1, titled "IDENTIFYING REGIONS OF INTEREST IN AN IMAGING FIELD OF VIEW," published May 18, 2023, which is hereby incorporated herein by reference in its entirety. Alternatively or additionally, in these examples, the zones can be altered autonomously by the security system (e.g., based on physical movement of an image capture device) as is described further below. In these ways, the system and processes described herein decrease the time required by customers to create and maintain zones.

Some security systems use one or more image capture devices installed at a monitored location to capture images of the location. The systems can execute various analytical processes using the captured images, such as edge detection, motion detection, facial recognition, and event reconstruction, among others. If a reportable event is detected as a result of process execution, the system can communicate an alert to a user device.

The techniques described herein may provide advantages over other systems by improving processing efficiency, processing speed, and/or network latency. For example, for event reconstruction, the techniques described herein enable a camera and/or system to transmit only portions of images outside one or more filter zones to a processing device (e.g., a server or cloud computing service) for event reconstruction. Accordingly, in such configurations only portions of captured images, as opposed to whole images, are used to reconstruct events. As another example, when one or more zones are used to control image analysis (e.g., motion detection), the system can transmit only portions of images to a remote location (e.g., server or cloud computing service) to perform image analysis on those portions. In addition, as described both herein and in U.S. Patent Application Publication Number 2023/0154296 A1, monitoring parameters associated with certain non-filter zones allow for further conservation of resources (e.g., where the monitoring parameters call for limited processing of the non-filter zones). In comparison to processing whole images using an exhaustive set of monitoring parameters, these examples result in significant improvement in processing efficiency, network latency, and processing speed because the examples process only a portion of the images, rather than whole images, and use limited monitoring parameters.

Other advantages of the example systems and methods include an easy-to-use tool, e.g., a GUI, that allows users to easily define zones using automatic image segmentation techniques and/or recommendation techniques that recommend zones. Since the shape of a zone can be any shape as determined by the segmentation (e.g., and not constrained to a rectangular bounding box), the user can accurately specify the zone. Such techniques can also allow a user to easily select a zone (e.g., without being required to use a mouse to manually draw a freeform region as in some systems). These and other techniques for specifying zones are described in U.S. Patent Application Publication Number 2023/0154296 A1 and will be further described below.

In some examples, the system can allow the user to select zones based on autonomously identified semantic regions. A semantic region in an image can include a set of pixels that depict a distinct, recognizable object, or group of related objects, within the image. For example, semantic regions for a scene around a home can include a front porch, a road, a lawn, a tree, a decoration item (e.g., plant box, flowers etc.) around the house, a pool, shrubs, patio furniture, etc. In some examples, the system can determine regions using an automated image analysis technique. For example, the automated image analysis technique can include performing semantic segmentation configured to segment the image into multiple semantic regions. For example, the system can determine a plurality of semantic regions of an image of a scene and display the plurality of semantic regions for the user to select/unselect as one or more zones. A scene can include any surroundings around an image capture device at a monitored location. The scene can include outdoor or indoor areas, or a combination thereof. For example, a scene can include a street view in front of a house or building on which a camera or image capture device is mounted on or adjacent thereto. A scene can also include a view inside the house about a camera or other image capture device (e.g., within a camera's FOV), such as the living room, bedroom and/or other areas in the house. A scene can likewise include any area inside a commercial building, such as a front desk area, a conference room, a secured area (e.g., a vault, a control room) in the building, and/or the like.

In some examples, the system can allow the user to select zones at a sub-region level, where a sub-region can represent an instance of an object in the image. For example, a semantic region can be a tree region (e.g., a set of pixels that represent one or more trees), where the semantic region can include multiple sub-regions each representing an instance of trees (i.e., an individual tree). Similarly, a patio furniture region (e.g., a set of pixels that represent one or more pieces of patio furniture) can include multiple sub-regions (instances) of patio furniture, and so on. In some examples, the system can perform instance segmentation on the plurality of segmented regions to associate each region with a respective class of objects, e.g., trees, patio, furniture, front porch, pool, etc., and identify one or more sub-regions (instances) for each region. Once determined, the system can display the sub-regions (instances) of the regions, and the user can select/unselect each sub-region as a zone. Techniques for identifying semantic regions are further described in U.S. Patent Application Publication Number 2023/0154296 A1.

In some examples, the system can adjust zones to accommodate physical movement of the image capture device. For instance, in at least one example, the system can determine, as part of routine visual processing of images, a change in the physical location and/or orientation of the camera in response to changes in positions (or disappearance) of anchor pixels within sequential image frames. These anchor pixels can be distributed at positions throughout the image to help ensure that transient conditions (e.g., objects moving through a scene and temporarily blocking visibility to an area) are not determined to be physical movement of the image capture device. In some examples, the system selects anchor pixels based on semantic regions identified within the images. For instance, in at least one example, the system selects anchor pixels that reside within semantic regions associated with physical objects that don't move under normal conditions, such as large trees, buildings, street signs, and the like. Further, in some examples, the system determines changes in positions within the FOV of anchor pixels between image frames and translates the changes to the in-FOV position of the zones. Further, in some examples, the system can present proposed translations of zones to a user for confirmation. Additionally or alternatively, the system can issue a tamper alert to a user device where physical movement of the camera results in a new scene or a substantially different scene (e.g., no anchor pixels remain in the FOV or an important region within the image is no longer in the FOV).

In some examples described further in U.S. Patent Application Publication Number 2023/0154296 A1, the system can recommend a zone for a user. For example, the system can display a score for one or more regions in the scene, where the score is indicative of a likelihood of the region being useful in creation of a zone. Then, the user can select the system recommended region(s) (or not) to determine the zone(s). In some examples, the system can automatically designate a recommended region as a zone. In some examples, the system can designate a region as a zone based on a classification of the region (e.g., highways can be automatically designated as zones). In some examples, the system can automatically designate a region as a zone based on prior activities (or lack thereof) in the region (e.g., if there is a lot of motion in one remote area, it can be designated as a zone).

In some examples, a zone can be categorized or otherwise grouped within a hierarchy by type (e.g., a zone type). For example, a zone can be a filter zone, which may not be subject to subsequent processing, or a non-filter zone, which may be subject to subsequent processing. Examples of non-filter zone types can include a delivery zone where packages can be delivered, a pet zone (e.g., an area in the back yard), and an intruder zone (e.g., an area in which no movement should occur at designated times). Non-filter zone types can be associated with (related to, mapped to, etc.) a set of one or more parameters (e.g., monitoring parameters). For example, for an intruder zone, the one or more parameters can include an event to be detected through image analysis, e.g., motion, a human face, etc. The one or more parameters can also include the time of the day for detecting the event. For example, for an intruder zone, the time for detecting the motion event can be 24 hours/7 days a week, evening hours/7 days a week, etc. For a delivery zone, the time for detecting the motion event can be normal business hours. In this example, the delivery zone shifts into a filter zone during non-business hours. Accordingly, outside the normal business hours, the system can be configured to not detect any event in the delivery zone, resulting in further reduction of network bandwidth use and computing power. In some examples, the system can use zone types to determine a threat score for events that occur within a zone. This threat score can be, for example, a metric that indicates a confidence that an event warrants review by a user for potential harm to a customer. For instance, in some examples, the system increases the threat score of an event detected in an intruder zone relative to an event detected in a delivery zone.

In some examples, once the user selects a region as a zone, the user can also designate the zone with a zone type as described above. In some examples, the system can determine the zone type based on how the user reacts to alerts for that zone. For example, if the system is configured to provide an alert upon detection of motion in a zone via a call or text message to a user device, and in response to the alert the user dispatches the police (e.g., via a call to 911) from the user device, the system can designate the zone as an intruder zone. In another example, if the system is configured to provide an alert upon detection of motion in a zone via a call to a user device, but the user does not pick up the call, the system can designate the zone as one of non-urgent nature or recommend that the zone be a filter zone. Thus, the techniques described herein also allow the zone type for a given zone to be initially determined and/or updated over time based on user responses.

In some examples, the monitoring parameters associated with a zone type can be pre-determined. For example, for an intruder zone, the one or more monitoring parameters can include motion detection during all time on a 24/7 basis, wherein the one or more monitoring parameters for a delivery zone can include motion detection only during the day and can reconfigure the delivery zone as a filter zone at other times. In some examples, the system can determine/ update monitoring parameter(s) for different zones based on prior activities for these zones. For example, if most of the triggers of motion in a delivery zone are detected during daylight, then the system can determine the monitoring parameters for the delivery zone to include motion detection only during daylight hours and to reconfigure the delivery zone as a filter zone during other hours.

In some examples, the system can capture one or more sequential images of a scene using an image capture device and transmit a portion of one or more of the images to a service for processing rather than transmitting the whole image. The system can determine the portion of the image to transmit based on the zones. In transmitting the portion of the image(s), the system can transmit only the pixels of the image(s) outside of filter zones. Additionally, the system can transmit metadata that describes the zones. For example, the metadata can include information about the pixels in the zones, such as the relative locations in the image. In some examples, the metadata can include any of the type of zone, the one or more monitoring parameters associated with the zone or a combination thereof. Additionally or alternatively, the metadata can include extracted features that define the zones. For example, the metadata can include motion flow, histograms of colors, image pixel density, and/or direction of motion for a set of pixels. The service can then reconstruct images using the transmitted features and the metadata.

The system can further detect one or more events in the reconstructed images based on parameter(s) of individual zones. In the examples described herein, the reconstructed images are much more compressed than whole images in that the reconstructed images include only pixels not included in filter zones. In some examples, the system can send an alert to a user device in response to detecting an event. An alert can also include an urgency, and the system can send the alert according to the urgency. In some examples, the urgency can indicate a communication channel (e.g., a call, a text message, or an email, among others) and/or the time for delivery (e.g., immediately; when user is available; at fixed time of the day; or on certain days, among others).

In some examples, the system utilizes a combination of filter zones and non-filter zones to focus the attention of monitoring personnel on particular regions within an FOV. This feature can be particularly helpful where the FOV includes distracting, but irrelevant, regions (e.g., a busy highway, distant bright or flashing lights, etc.). For instance, in some examples, distracting, but irrelevant, regions can be covered by a filter zone and interesting regions (e.g., a door, window, etc.) can be covered by a non-filter zone (e.g., an intruder zone). Once these zones are established, the system can render images within user interfaces that both redact regions covered by filter zones and highlight regions covered by non-filter zones.

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the described advantages will be achieved with every example.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

FIG. 1 is a schematic diagram of a security system 100 configured to establish and utilize zones when monitoring geographically disparate locations in accordance with some examples. As shown in FIG. 1, the system 100 includes a monitored location 102A, a monitoring center environment 120, a data center environment 124, one or more customer devices 122, and a communication network 118. Each of the monitored location 102A, the monitoring center 120, the data center 124, the one or more customer devices 122, and the communication network 118 include one or more computing devices (e.g., as described below with reference to FIG. 12). The one or more customer devices 122 are configured to host one or more customer interface applications 132. The monitoring center environment 120 is configured to host one or more monitor interface applications 130. The data center environment 124 is configured to host a surveillance service 128 and one or more transport services 126. The location 102A includes image capture devices 104 and 110, a contact sensor assembly 106, a keypad 108, a motion sensor assembly 112, a base station 114, and a router 116. The base station 114 hosts a surveillance client 136. The image capture device 110 hosts a camera agent 138. The security devices disposed at the location 102A (e.g., devices 104, 106, 108, 110, 112, and 114) may be referred to herein as location-based devices.

In some examples, the router 116 is a wireless router that is configured to communicate with the location-based devices via communications that comport with a communications standard such as any of the various Institute of Electrical and Electronics Engineers (IEEE) 802.11 standards. As illustrated in FIG. 1, the router 116 is also configured to communicate with the network 118. It should be noted that the router 116 implements a local area network (LAN) within and proximate to the location 102A by way of example only. Other networking technology that involves other computing devices is suitable for use within the location 102A. For instance, in some examples, the base station 114 can receive and forward communication packets transmitted by the image capture device 110 via a point-to-point personal area network (PAN) protocol, such as BLUETOOTH. Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, internet protocol (IP). The network 118 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as Code Division Multiple Access (CDMA), Global System for Mobiles (GSM), and the like.

The network 118 connects and enables data communication between the computing devices within the location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment. It should be noted that, in some examples, the network 118 and the network within the location 102A support other communication protocols, such as MQTT or other IoT protocols.

Continuing with the example of FIG. 1, the data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the security system 100, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 1, the data center environment 124 is configured to host the surveillance service 128 and the transport services 126.

Continuing with the example of FIG. 1, the monitoring center environment 120 can include a plurality of computing devices (e.g., desktop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the monitor interfaces 130 and the customer devices 122 are configured to host the customer interfaces 132.

Continuing with the example of FIG. 1, the devices 104, 106, 110, and 112 are configured to acquire analog signals via sensors incorporated into the devices, generate digital sensor data based on the acquired signals, and communicate (e.g. via a wireless link with the router 116) the sensor data to the base station 114, the monitor interface 130, and/or the customer interface 132. The type of sensor data generated and communicated by these devices varies along with the type of sensors included in the devices. For instance, the image capture devices 104 and 110 can acquire ambient light, generate frames of image data based on the acquired light, and communicate the frames to the base station 114, the monitor interface 130, and/or the customer interface 132, although the pixel resolution and frame rate may vary depending on the capabilities of the devices. In some examples, the image capture devices 104 and 110 can also receive and store filter zone configuration data and filter the frames using one or more filter zones prior to communicating the frames to the base station 114. As shown in FIG. 1, the image capture device 104 has an FOV that originates proximal to a front door of the location 102A and can acquire images of a walkway, highway, and a space between the location 102A and the highway. The image capture device 110 has an FOV that originates proximal to a bathroom of the location 102A and can acquire images of a living room and dining area of the location 102A. The image capture device 110 can further acquire images of outdoor areas beyond the location 102A through windows 117A and 117B on the right side of the location 102A.

Further, as shown in FIG. 1, in some examples the image capture device 110 is configured to communicate with the surveillance service 128, the monitor interfaces 130, and the customer interfaces 132 separately from the surveillance client 136 via execution of the camera agent 138. These communications can include sensor data generated by the image capture device 110 and/or commands to be executed by the image capture device 110 sent by the surveillance service 128, the monitor interfaces 130, and/or the customer interfaces 132. The commands can include, for example, requests for interactive communication sessions in which monitoring personnel and/or customers interact with the image capture device 110 via the monitor interfaces 130 and the customer interfaces 132. These interactions can include requests for the image capture device 110 to transmit additional sensor data and/or requests for the image capture device 110 to render output via a user interface (e.g., the user interface 412 of FIG. 4B). This output can include audio and/or video output.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate sensor data indicating whether the front door of the location 102A is open or closed to the base station 114. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alert state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of changes in temperature rather than changes in reflected sound waves.

Continuing with the example of FIG. 1, the keypad 108 is configured to interact with a user and interoperate with the other location-based devices in response to interactions with the user. For instance, in some examples, the keypad 108 is configured to receive input from a user that specifies one or more commands and to communicate the specified commands to one or more addressed devices or processes. These addressed devices or processes can include one or more of the location-based devices and/or one or more of the monitor interfaces 130 or the surveillance service 128. The commands can include, for example, codes that authenticate the user as a resident of the location 102A and/or codes that request activation or deactivation of one or more of the location-based devices. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive responses to the communicated commands and render the responses via the user interface as visual or audio output.

Continuing with the example of FIG. 1, the base station 114 is configured to interoperate with other security system location-based devices to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include filtering the sensor data using one or more filter zones and/or generating one or more summaries (maximum values, average values, changes in values since the previous communication of the same, etc.) of multiple sensor readings. To implement local command and control functionality, the base station 114 executes a variety of programmatic operations through execution of the surveillance client 136 in response to various events. Examples of these events can include reception of commands from the keypad 108 or the customer interface application 132, reception of commands from one of the monitor interfaces 130 or the customer interface application 132 via the network 118, or detection of the occurrence of a scheduled event. The programmatic operations executed by the base station 114 via execution of the surveillance client 136 in response to events can include activation or deactivation of one or more of the devices 104, 106, 108, 110, and 112; sounding of an alarm; reporting an event to the surveillance service 128; and communicating location data to one or more of the transport services 126 to name a few operations. The location data can include data specifying sensor readings (sensor data), configuration data of any of the location-based devices, commands input and received from a user (e.g., via the keypad 108 or a customer interface 132), or data derived from one or more of these data types (e.g., filtered sensor data, summarizations of sensor data, event data specifying an event detected at the location via the sensor data, etc).

Continuing with the example of FIG. 1, the transport services 126 are configured to securely, reliably, and efficiently exchange messages between processes implemented by the location-based devices and processes implemented by other devices in the system 100. These other devices can include the customer devices 122, devices disposed in the data center environment 124, and/or devices disposed in the monitoring center environment 120. In some examples, the transport services 126 are also configured to parse messages from the location-based devices to extract payloads included therein and store the payloads and/or data derived from the payloads within one or more data stores hosted in the data center environment 124. The data housed in these data stores may be subsequently accessed by, for example, the surveillance service 128, the monitor interfaces 130, and the customer interfaces 132.

In certain examples, the transport services 126 expose and implement one or more application programming interfaces (APIs) that are configured to receive, process, and respond to calls from processes (e.g., the surveillance client 136) implemented by base stations (e.g., the base station 114).

Individual instances of a transport service within the transport services 126 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the transport services 126. In some examples, portions of the HTTP communications are encrypted to increase security. Alternatively or additionally, in some examples, the API is implemented as a .NET web API that responds to HTTP posts to particular URLs. Alternatively or additionally, in some examples, the API is implemented using simple file transfer protocol commands. Thus, the APIs as described herein are not limited to any particular implementation, and the transport services 126 are not limited to a particular protocol or architectural style. It should be noted that, in at least some examples, the transport services 126 can transmit one or more API calls to location-based devices to request data from, or an interactive communication session with, the location-based devices.

Continuing with the example of FIG. 1, the surveillance service 128 is configured to control overall logical setup and operation of the system 100. As such, the surveillance service 128 can interoperate with the transport services 126, the monitor interfaces 130, the customer interfaces 132, and any of the location-based devices via the network 118. In some examples, the surveillance service 128 is configured to monitor data from a variety of sources for reportable events (e.g., a break-in event) and, when a reportable event is detected, notify one or more of the monitor interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This feature can prevent a "crash and smash" robbery from being successfully executed. In addition, in some examples, the surveillance service 128 is configured to set up and utilize zones. Such setup of the zones can include interacting with monitoring personnel via the monitor interfaces 130, interacting with a customer via a customer interface 132, and/or executing autonomous zone recommendation processes as described herein. Further example processes that the surveillance service 128 is configured to execute are described below with reference to FIGS. 6-9.

Continuing with the example of FIG. 1, individual monitor interfaces 130 are configured to control computing device interaction with monitoring personnel and to execute a variety of programmatic operations in response to the interactions. For instance, in some examples, the monitor interface 130 controls its host device to provide information regarding reportable events detected at monitored locations, such as the location 102A, to monitoring personnel. Such events can include, for example, movement within an intruder zone or outside a filter zone. Alternatively or additionally, in some examples, the monitor interface 130 controls its host device to interact with a user to configure features of the system 100, such as one or more monitor zones. Further example processes that the monitor interface 130 is configured to execute are described below with reference to FIGS. 6, 7, 10, and 11.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, movement within an intruder zone or outside a filter zone. Alternatively or additionally, in some examples, the customer interface 132 is configured to process input received from the customer to activate or deactivate one or more of the location-based devices. Further still, in some examples, the customer interface 132 configures features of the system 100, such as one or more customer zones, in response to input from a user. Further example processes that the customer interface 132 is configured to execute are described below with reference to FIGS. 6, 7, 10, and 11.

Turning now to FIG. 2, an example base station 114 is schematically illustrated. As shown in FIG. 2, the base station 114 includes at least one processor 200, volatile memory 202, non-volatile memory 206, at least one network interface 204, a user interface 212, a battery assembly 214, and an interconnection mechanism 216. The non-volatile memory 206 stores executable code 208 and includes a data store 210. In some examples illustrated by FIG. 2, the features of the base station 114 enumerated above are incorporated within, or are a part of, a housing 218.

In some examples, the non-volatile (non-transitory) memory 206 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 208 stored in the non-volatile memory can include an operating system and one or more applications or programs that are configured to execute under the operating system. Alternatively or additionally, the code 208 can include specialized firmware and embedded software that is executable without dependence upon a commercially available operating system. Regardless, execution of the code 208 can implement the surveillance client 136 of FIG. 1 and can result in manipulated data that is a part of the data store 210.

Continuing the example of FIG. 2, the processor 200 can include one or more programmable processors to execute one or more executable instructions, such as a computer program specified by the code 208, to control the operations of the base station 114. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 202) and executed by the circuitry. In some examples, the processor 200 is a digital processor, but the processor 200 can be analog, digital, or mixed. As such, the processor 200 can execute the function, operation, or sequence of operations using digital values and/or using analog signals. In some examples, the processor 200 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 200 that are multicore can provide functionality for parallel, simultaneous execution of instructions or for parallel, simultaneous execution of one instruction on more than one piece of data.

Continuing with the example of FIG. 2, prior to execution of the code 208 the processor 200 can copy the code 208 from the non-volatile memory 206 to the volatile memory 202. In some examples, the volatile memory 202 includes one or more static or dynamic random access memory (RAM) chips and/or cache memory (e.g. memory disposed on a silicon die of the processor 200). Volatile memory 202 can offer a faster response time than a main memory, such as the non-volatile memory 206.

Through execution of the code 208, the processor 200 can control operation of the network interface 204. For instance, in some examples, the network interface 204 includes one or more physical interfaces (e.g., a radio, an ethernet port, a universal serial bus (USB) port, etc.) and a software stack including drivers and/or other code 208 that is configured to communicate with the one or more physical interfaces to support one or more LAN, PAN, and/or WAN standard communication protocols. The communication protocols can include, for example, transmission control protocol (TCP) and user datagram protocol (UDP) among others. As such, the network interface 204 enables the base station 114 to access and communicate with other computing devices (e.g., the other location-based devices of FIG. 1) via a computer network (e.g., the LAN established by the router 116 of FIG. 1, the network 118 of FIG. 1, and/or a point-to-point connection). For instance, in at least one example, the network interface 204 utilizes sub-GHz wireless networking to transmit wake messages to the other computing devices to request streams of sensor data or other operations. Use of sub-GHz wireless networking can improve operable communication distances and/or reduce power consumed to communicate.

Through execution of the code 208, the processor 200 can control operation of the user interface 212. For instance, in some examples, the user interface 212 includes user input and/or output devices (e.g., a keyboard, a mouse, a touchscreen, a display, a speaker, a camera, an accelerometer, a biometric scanner, an environmental sensor, etc.) and a software stack including drivers and/or other code 208 that is configured to communicate with the user input and/or output devices. For instance, the user interface 212 can be implemented by a customer device 122 hosting a mobile application (e.g., a customer interface 132). The user interface 212 enables the base station 114 to interact with users to receive input and/or render output. This rendered output can include, for instance, one or more GUIs including one or more controls configured to display output and/or receive input. The input can specify values to be stored in the data store 210. The output can indicate values stored in the data store 210. It should be noted that, in some examples, parts of the user interface 212 are accessible and/or visible as part of, or through, the housing 218. These parts of the user interface 212 can include, for example, one or more light-emitting diodes (LEDs). Alternatively or additionally, in some examples, the user interface 212 includes a 95 dB siren that the processor 200 sounds to indicate that a break-in event has been detected.

Continuing with the example of FIG. 2, the various features of the base station 114 described above can communicate with one another via the interconnection mechanism 216. In some examples, the interconnection mechanism 216 includes a communications bus. In addition, in some examples, the battery assembly 214 is configured to supply operational power to the various features of the base station 114 described above. In some examples, the battery assembly 214 includes at least one rechargeable battery (e.g., one or more NiMH or lithium batteries). In some examples, the rechargeable battery has a runtime capacity sufficient to operate the base station 114 for 24 hours or longer while the base station 114 is disconnected from or otherwise not receiving line power. Alternatively or additionally, in some examples, the battery assembly 214 includes power supply circuitry to receive, condition, and distribute line power to both operate the base station 114 and recharge the rechargeable battery. The power supply circuitry can include, for example, a transformer and a rectifier, among other circuitry, to convert AC line power to DC device and recharging power.

Turning now to FIG. 3, an example keypad 108 is schematically illustrated. As shown in FIG. 3, the keypad 108 includes at least one processor 300, volatile memory 302, non-volatile memory 306, at least one network interface 304, a user interface 312, a battery assembly 314, and an interconnection mechanism 316. The non-volatile memory 306 stores executable code 308 and data store 310. In some examples illustrated by FIG. 3, the features of the keypad 108 enumerated above are incorporated within, or are a part of, a housing 318.

In some examples, the respective descriptions of the processor 200, the volatile memory 202, the non-volatile memory 206, the interconnection mechanism 216, and the battery assembly 214 with reference to the base station 114 are applicable to the processor 300, the volatile memory 302, the non-volatile memory 306, the interconnection mechanism 316, and the battery assembly 314 with reference to the keypad 108. As such, those descriptions will not be repeated here.

Continuing with the example of FIG. 3, through execution of the code 308, the processor 300 can control operation of the network interface 304. In some examples, the network interface 304 includes one or more physical interfaces (e.g., a radio, an ethernet port, a USB port, etc.) and a software stack including drivers and/or other code 308 that is configured to communicate with the one or more physical interfaces to support one or more LAN, PAN, and/or WAN standard communication protocols. These communication protocols can include, for example, TCP, UDP, HTTP, and MQTT among others. As such, the network interface 304 enables the keypad 108 to access and communicate with other computing devices (e.g., the other location-based devices of FIG. 1) via a computer network (e.g., the LAN established by the router 116 and/or a point-to-point connection).

Continuing with the example of FIG. 3, through execution of the code 308, the processor 300 can control operation of the user interface 312. In some examples, the user interface 312 includes user input and/or output devices (e.g., physical keys arranged as a keypad, a touchscreen, a display, a speaker, a camera, a biometric scanner, an environmental sensor, etc.) and a software stack including drivers and/or other code 308 that is configured to communicate with the user input and/or output devices. As such, the user interface 312 enables the keypad 108 to interact with users to receive input and/or render output. This rendered output can include, for instance, one or more GUIs including one or more controls configured to display output and/or receive input. The input can specify values to be stored in the data store 310. The output can indicate values stored in the data store 310. It should be noted that, in some examples, parts of the user interface 312 (e.g., one or more LEDs) are accessible and/or visible as part of, or through, the housing 318.

Figure 4A:
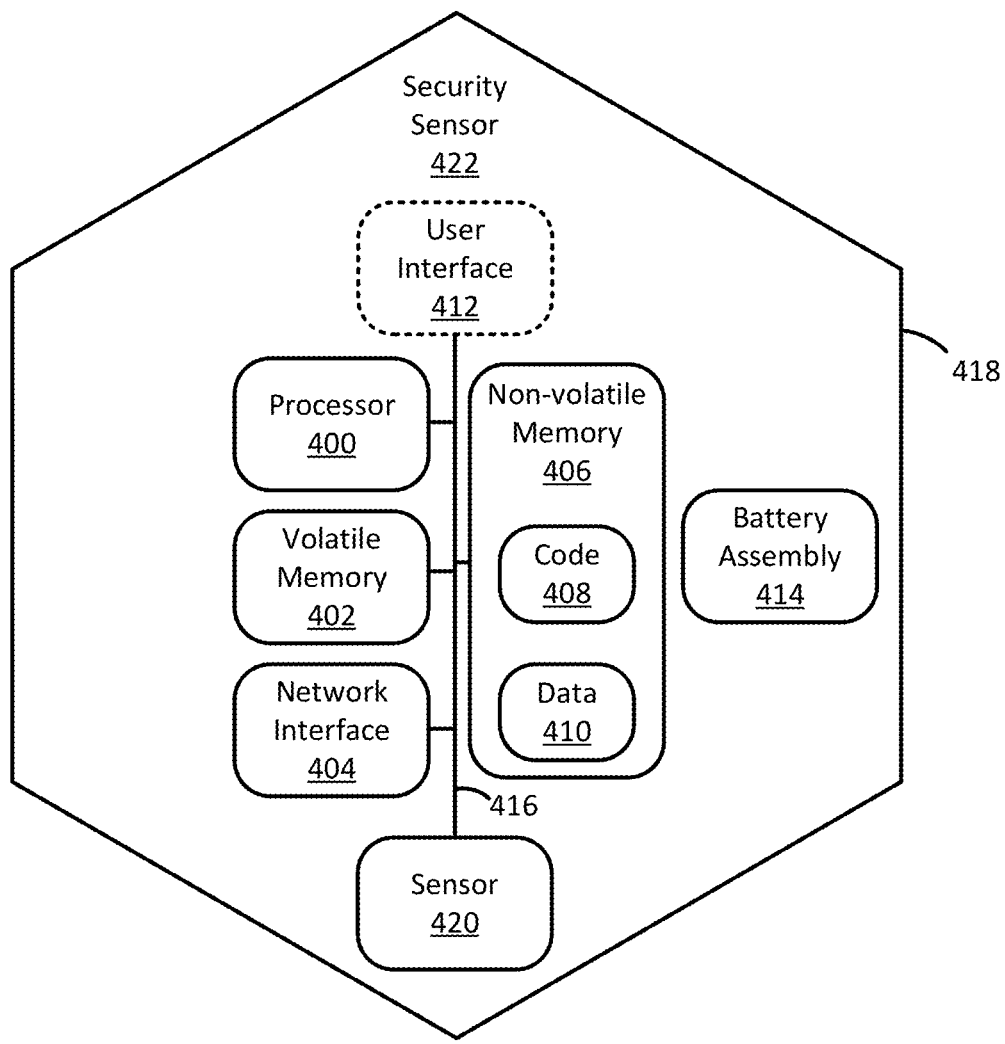
FIG. 4A is a schematic diagram of a security sensor, according to some examples described herein.

Turning now to FIG. 4A, an example security sensor assembly 422 is schematically illustrated. Particular configurations of the security sensor assembly 422 (e.g., the image capture devices 104 and 110, the motion sensor assembly 112, and the contact sensor assemblies 106) are illustrated in FIG. 1 and described above. As shown in FIG. 4A, the sensor assembly 422 includes at least one processor 400, volatile memory 402, non-volatile memory 406, at least one network interface 404, a battery assembly 414, an interconnection mechanism 416, and at least one sensor 420. The non-volatile memory 406 stores executable code 408 and data store 410. Some examples include a user interface 412. In certain examples illustrated by FIG. 4A, the features of the sensor assembly 422 enumerated above are incorporated within, or are a part of, a housing 418.

In some examples, the respective descriptions of the processor 200, the volatile memory 202, the non-volatile memory 206, the interconnection mechanism 216, and the battery assembly 214 with reference to the base station 114 are applicable to the processor 400, the volatile memory 402, the non-volatile memory 406, the interconnection mechanism 416, and the battery assembly 414 with reference to the sensor assembly 422. As such, those descriptions will not be repeated here.

Continuing with the example of FIG. 4A, through execution of the code 408, the processor 400 can control operation of the network interface 404 and the user interface 412. In some examples, the network interface 404 includes one or more physical interfaces (e.g., a radio, an ethernet port, a USB port, etc.) and a software stack including drivers and/or other code 408 that is configured to communicate with the one or more physical interfaces to support one or more LAN, PAN, and/or WAN standard communication protocols. The communication protocols can include, for example, TCP, UDP, HTTP, and MQTT, among others. As such, the network interface 404 enables the sensor assembly 422 to access and communicate with other computing devices (e.g., the other location-based devices disposed in the location 102A of FIG. 1) via a computer network (e.g., the LAN established by the router 116 and/or a point to point connection). For instance, in at least one example, when executing the code 408, the processor 400 controls the network interface to stream (e.g., via UDP) sensor data acquired from the sensor assembly 420 to the base station 114. Alternatively or additionally, in at least one example, through execution of the code 408, the processor 400 can control the network interface 404 to enter a power conservation mode by powering down a 2.4 GHz radio and powering up a sub-GHz radio that are both included in the network interface 404. In this example, through execution of the code 408, the processor 400 can control the network interface 404 to enter a streaming or interactive mode by powering up a 2.4 GHz radio and powering down a sub-GHz radio, for example, in response to receiving a wake signal from the base station via the sub-GHz radio.

Continuing with the example of FIG. 4A, through execution of the code 408, the processor 400 can control operation of the user interface 412. In some examples, the user interface 412 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 408 that is configured to communicate with the user input and/or output devices. As such, the user interface 412 enables the sensor assembly 422 to interact with users to receive input and/or render output. This rendered output can include, for instance, one or more GUIs including one or more controls configured to display output and/or receive input. The input can specify values to be stored in the data store 410. The output can indicate values stored in the data store 410. It should be noted that, in some examples, parts of the user interface 412 are accessible and/or visible as part of, or through, the housing 418.

Continuing with the example of FIG. 4A, the sensor assembly 420 can include one or more types of sensors, such as the sensors described above with reference to the image capture devices 104 and 110, the motion sensor assembly 112, and the contact sensor assembly 106 of FIG. 1, or other types of sensors. For instance, in at least one example, the sensor assembly 420 includes an image sensor (e.g., a charge coupled device or an active pixel sensor) and/or a temperature or thermographic sensor (e.g., an active and/or passive infrared (PIR) sensor). Regardless of the type of sensor or sensors housed, the processor 400 can (e.g., via execution of the code 408) acquire sensor data from the housed sensor and stream the acquired sensor data to the processor 400 for communication to the base station.

It should be noted that, in some examples of the devices 108 and 422, the operations executed by the processors 300 and 400 while under control of respective control of the code 308 and 408 may be hardcoded and/or implemented in hardware, rather than as a combination of hardware and software. Moreover, execution of the code 408 can implement the camera agent 138 of FIG. 1 and can result in manipulated data that is a part of the data store 410.

Figure 4B:
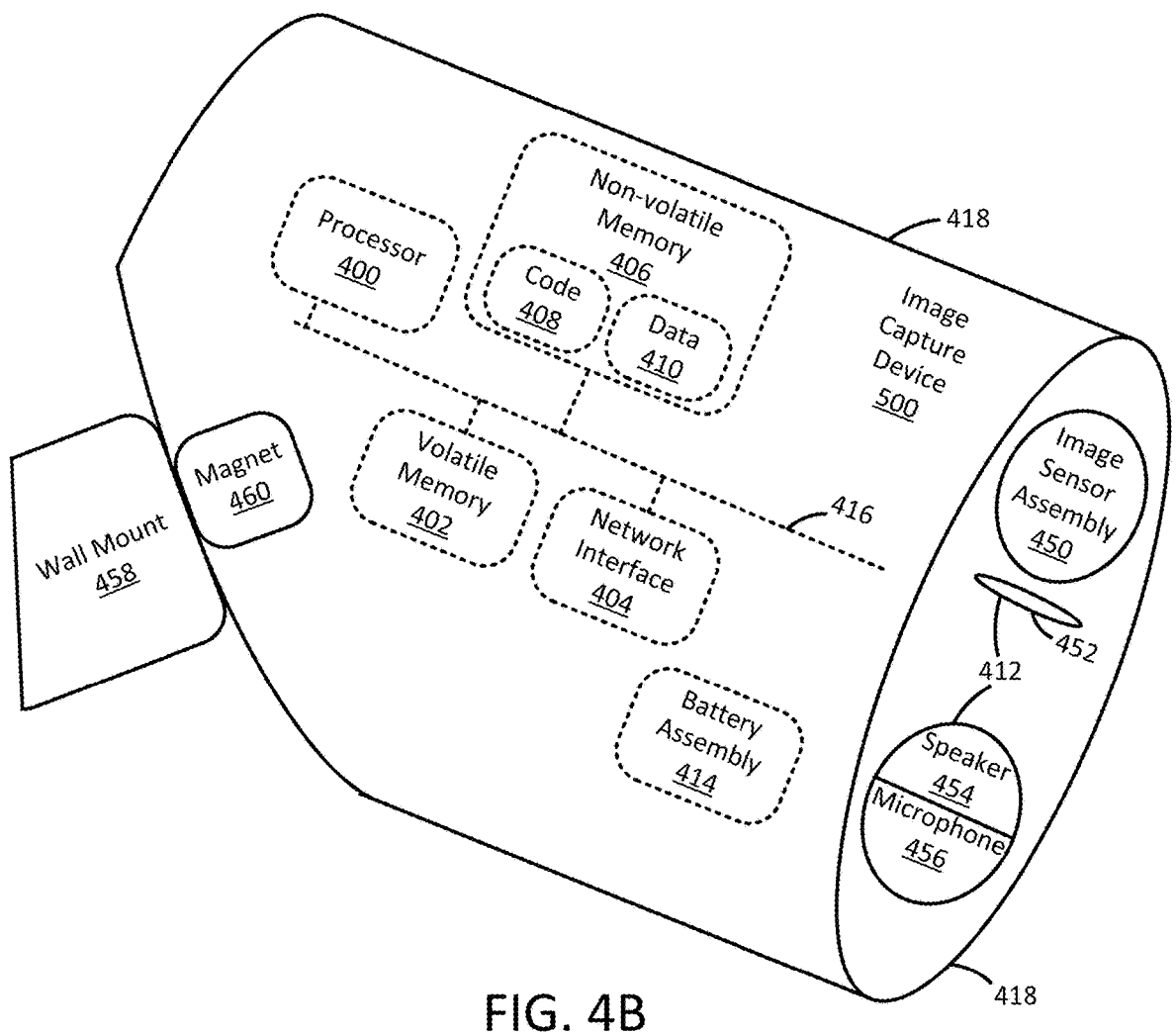
FIG. 4B is a schematic diagram of an image capture device, according to some examples described herein.

Turning now to FIG. 4B, an example image capture device 500 is schematically illustrated. Particular configurations of the image capture device 500 (e.g., the image capture devices 104 and 110) are illustrated in FIG. 1 and described above. As shown in FIG. 4B, the image capture device 500 includes at least one processor 400, volatile memory 402, non-volatile memory 406, at least one network interface 404, a battery assembly 414, and an interconnection mechanism 416. These features of the image capture device are illustrated in dashed lines to indicate that they reside within a housing 418. The non-volatile memory 406 stores executable code 408 and a data store 410.

Some examples further include an image sensor assembly 450, a light 452, a speaker 454, a microphone 456, a wall mount 458, and a magnet 460. The image sensor assembly 450 may include a lens and an image sensor (e.g., a charge-coupled device or an active-pixel sensor) and/or a temperature or thermographic sensor (e.g., an active and/or passive infrared (PIR) sensor). The light 452 may include a light emitting diode (LED), such as a red-green-blue emitting LED. The light 452 may also include an infrared emitting diode in some examples. The speaker 454 may include a transducer configured to emit sound in the range of 60 dB to 80 dB or louder. Further, in some examples, the speaker 454 can include a siren configured to emit sound in the range of 70 dB to 90 dB or louder. The microphone 456 may include a micro electro-mechanical system (MEMS) microphone. The wall mount 458 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 460 to magnetically couple to the wall mount 458, thereby holding the image capture device 500 in place.

In some examples, the respective descriptions of the processor 400, the volatile memory 402, the network interface 404, the non-volatile memory 406, the code 408 with respect to the network interface 404, the interconnection mechanism 416, and the battery assembly 414 with reference to the security sensor 422 are applicable to these same features with reference to the image capture device 500. As such, those descriptions will not be repeated here.

Continuing with the example of FIG. 4B, through execution of the code 408, the processor 400 can control operation of the image sensor assembly 450, the light 452, the speaker 454, and the microphone 456. For instance, in at least one example, when executing the code 408, the processor 400 controls the image sensor assembly 450 to acquire sensor data, in the form of image data, to be streamed to the base station 114 (or one of the processes 130, 128, or 132 of FIG. 1) via the network interface 404. Alternatively or additionally, in at least one example, through execution of the code 408, the processor 400 controls the light 452 to emit light so that the image sensor assembly 450 collects sufficient reflected light to compose the image data. Further, in some examples, through execution of the code 408, the processor 400 controls the speaker 454 to emit sound. This sound may be locally generated (e.g., a sonic alert via the siren) or streamed from the base station 114 (or one of the processes 130, 128 or 132 of FIG. 1) via the network interface 404 (e.g., utterances from the user or monitoring personnel). Further still, in some examples, through execution of the code 408, the processor 400 controls the microphone 456 to acquire sensor data in the form of sound for streaming to the base station 114 (or one of the processes 130, 128 or 132 of FIG. 1) via the network interface 404.

It should be appreciated that in the example of FIG. 4B, the light 452, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 500 illustrated in FIG. 4B is at least one example of the security sensor 422 illustrated in FIG. 4A.

Figure 5:
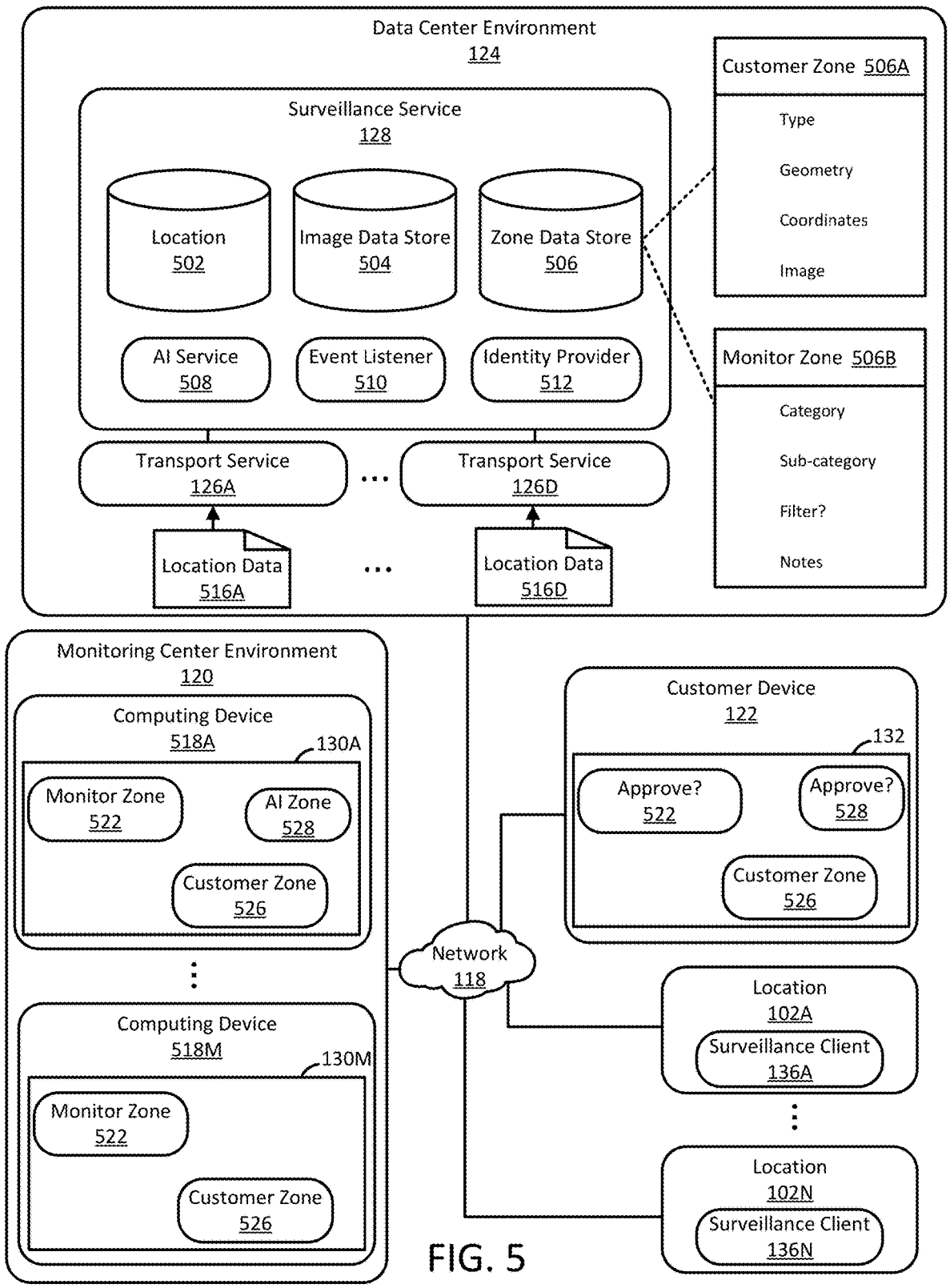
FIG. 5 is a schematic diagram of a data center environment, a monitoring center environment, and a customer device, according to some examples described herein.

Turning now to FIG. 5, aspects of the data center environment 124 of FIG. 1, the monitoring center environment 120 of FIG. 1, one of the customer devices 122 of FIG. 1, the network 118 of FIG. 1, and a plurality of monitored locations 102A of FIG. 1 through 102N (collectively referred to as the locations 102) are schematically illustrated. As shown in FIG. 5, the data center environment 124 includes the surveillance service 128 and the transport services 126 (individually referred to as the transport services 126A through 126D) and location data packages 516A through 516D (collectively referred to as the location data packages 516). The surveillance service 128 includes a location data store 502, an image data store 504, a zone data store 506, an artificial intelligence (AI) service 508, an event listening service 510, and an identity provider 512. The zone data store 506 houses at least two types of records, customer zone records 506A and monitor zone records 506B. The monitoring center environment 120 includes computing devices 518A through 518M (collectively referred to as the computing devices 518) that host monitor interfaces 130A through 130M). Individual locations 102A through 102N include base stations (e.g., the base station 114 of FIG. 1, not shown) that host the surveillance clients 136A through 136N (collectively referred to as the surveillance clients 136).

As shown in FIG. 5, the location data store 502 is configured to store, within a plurality of records, location data in association with identifiers of customers for whom the location is monitored. For example, the location data may be stored in a record with an identifier of a customer and/or an identifier of the location to associate the location data with the customer and the location. The image data store 504 is configured to store, within a plurality of records, one or more frames of image data in association with identifiers of locations and timestamps at which the image data was acquired. The zone data store 506 is configured to store, within a plurality of records (e.g., of the type 506A or 506B), zone definitions in association with identifiers of image capture devices to which the definitions apply. In some examples, zones defined in a customer zone record of the 506A type have been approved for use by customers (e.g., via a customer interface 132) and zones defined in a monitor zone record 506B have been approved for use by monitors (e.g., via a monitor interface 130).

Continuing with the example of FIG. 5, zone records 506A include a type field, a geometry field, a coordinates field, and an image field. The type field is configured to store an identifier of the type of zone specified by the zone record. Examples of values that may be stored in the type field include "filter", "intruder", "loading zone", and "non-filter" to name a few examples. The geometry field is configured to store a vector of values specifying the geometry of the zone. Examples of values that may be stored in the geometry field include "s,60" (specifying a square with sides of length 60 pixels); "r,45,90" (specifying a rectangle with a height of 45 pixels and a length of 90 pixels), and "c,89" (specifying a circle having a radius of 89 pixels). The coordinates field is configured to store an identifier of a position within a frame for a reference pixel of the zone. Examples of values that may be stored in the coordinates field include "125,453" (specifying the position of the reference pixel as being 125 pixels offset horizontally and 453 vertically from the origin pixel in the frame). The image field is configured to hold an identifier of an image to which the zone applies. Example values that may be stored in the image field include "file1.avi,2232" (specifying a frame offset of 2232 from the first image in a sequence of images stored in the "file1.avi" Audio Video Interleave (AVI) file).

Continuing with the example of FIG. 5, monitor zone records 506B include a category field, a sub-category field, a filter field, and a notes field. The category field is configured to store an identifier of a semantic region concomitant with the monitor zone specified by the record. Examples of values that may be stored in the category field include "trees", "shrubs", and "walkway" to name a few. The sub-category field is configured to store an identifier of a semantic sub-region concomitant with the monitor zone. Examples of values that may be stored in the sub-category field include "tree 1", "shrub 3", and the like. The filter field is configured to store a Boolean value indicating whether the monitor region is a filter region or a non-filter region. Examples of values that may be stored in the filter field include "0" or "1". The notes field is configured to store a description and/or additional information regarding the monitor zone. Examples of values that may be stored in the notes field include "busy during evening hours", "call customer before alerting authorities to activity in this zone", or the like.

Continuing with the example of FIG. 5, the AI service 508 is configured to process images and/or sequences of images to identify semantic regions, movement, human faces, and other features within images or a sequence of images. The event listener 510 is configured to scan inbound location data for events and, where an event is identified, execute one or more event handlers to process the event. In some examples, the event handlers can include an event reporter that is configured to identify reportable events and to communicate messages communicating the reportable events to one or more recipient processes (e.g., a customer interface 132 and/or a monitor interface 130). In some examples, the event listener 510 can interoperate with the AI service 508 to identify events within image data. The identity provider 512 is configured to receive authentication requests from the surveillance clients 136 that include security credentials. When the identity provider 512 can authenticate the security credentials in a request (e.g., via a validation function, cross-reference look-up, or some other authentication process), the identity provider 512 can communicate a security token in response to the request. A surveillance client 136 can receive, store, and include the security token in subsequent packages of location data (e.g., the location data 516A), so that the transport service 126A is able to securely process (e.g., unpack/parse) the packages to extract the location data prior to passing the location data to the surveillance service 128. Processes that the surveillance service 128 is configured to execute are described further below with reference to FIGS. 6-9.

Continuing with the example of FIG. 5, the transport services 126 are configured to receive the location data packages 516, verify the authenticity of the packages 516, parse the packages 516, and extract the location data encoded therein prior to passing the location data to the surveillance service 128 for processing. This location data can include any of the location data described above with reference to FIG. 1. Individual transport services 126 may be configured to process location data packages 516 generated by location-based monitoring equipment of a particular manufacturer and/or model. The surveillance clients 136 are configured to generate and communicate, to the surveillance service 128 via the network 118, packages of location data (e.g., the location data packages 516) based on sensor information received at the locations 102.

Continuing with the example of FIG. 5, the computing devices 518 are configured to host the monitor interfaces 130. In some examples, individual monitor interfaces 130A-130M are configured to render GUIs including one or more image frames overlaid with one or more zones. For instance, as illustrated in FIG. 5, the monitor interface 130A can render a GUI including an image frame overlaid with a monitor zone 522, a customer zone 526, and an AI recommended zone 528. Similarly, the monitor interface 130M can render a GUI comprising an image frame overlaid with the monitor zone 522 and the customer zone 526. In some examples, the monitor interface 130A may create and save the monitor zone 522, based on input received from a user, for use by other monitoring personnel, such as the user of the monitor interface 130M, who can copy and/or change attributes of the monitor zone 522. One example of a GUI screen that the monitor interfaces 130 are configured to render for this purpose is illustrated below with reference to FIG. 10. To save the monitor zone 522, the monitor interfaces 130 can interoperate with the surveillance service 128 via one or more API calls. The surveillance service 128 is configured to store zone setup information defining the monitor zone 522 in the zone data store 506 in response to these API calls. Moreover, in certain examples, the monitor interface 130A may request, in response to input received from the user or as a part of routine processing, that the AI service 508 recommend one or more zones for the image. In some examples, the AI service 508 is configured to respond to such a request by analysing the image and recommending one or more regions within the image to be one or more zones and recording any recommended zones within the zone data store 506. The monitor interface 130A can identify the AI recommended zone 528 and render it along with the other zones defined in the zone data store 506. U.S. Patent Application Publication Number 2023/0154296 A1 also describes techniques that are utilized in some examples to identify and/or recommend zones.

Continuing with the example of FIG. 5, the customer device 122 is configured to host the customer interface 132. In some examples, customer interface 132 is configured to render GUIs including one or more image frames overlaid with one or more zones. For instance, as illustrated in FIG. 5, the customer interface 132 can render a GUI including an image frame overlaid with the monitor zone 522, the customer zone 526, and the AI recommended zone 528. As illustrated in FIG. 5, in some examples, the customer interface 132 can request that the customer approve the monitor zone 522 and the AI recommended zone 528. In some examples, the approval request is express, but in others, the approval request takes the form of simply presenting the zones 522 and 528 such that the zones 522 and 528 will be saved along with any other zone configuration data included in a GUI screen. One example of a GUI screen that the customer interface 132 is configured to render for this purpose is illustrated below with reference to FIG. 10. Regardless of the specific interaction required for approval, if the customer approves of a monitor or AI recommended zone, the approved zone is recorded as approved in the zone data store 506. For instance, in certain examples, the customer interface 132 requests that the approved zone be recorded as such via one or more API calls to the surveillance service 128. Such approval can result in additional processing, such as communication of the zone configuration data to an image capture device, one example of which is described further below with reference to FIG. 7.

Figure 6:
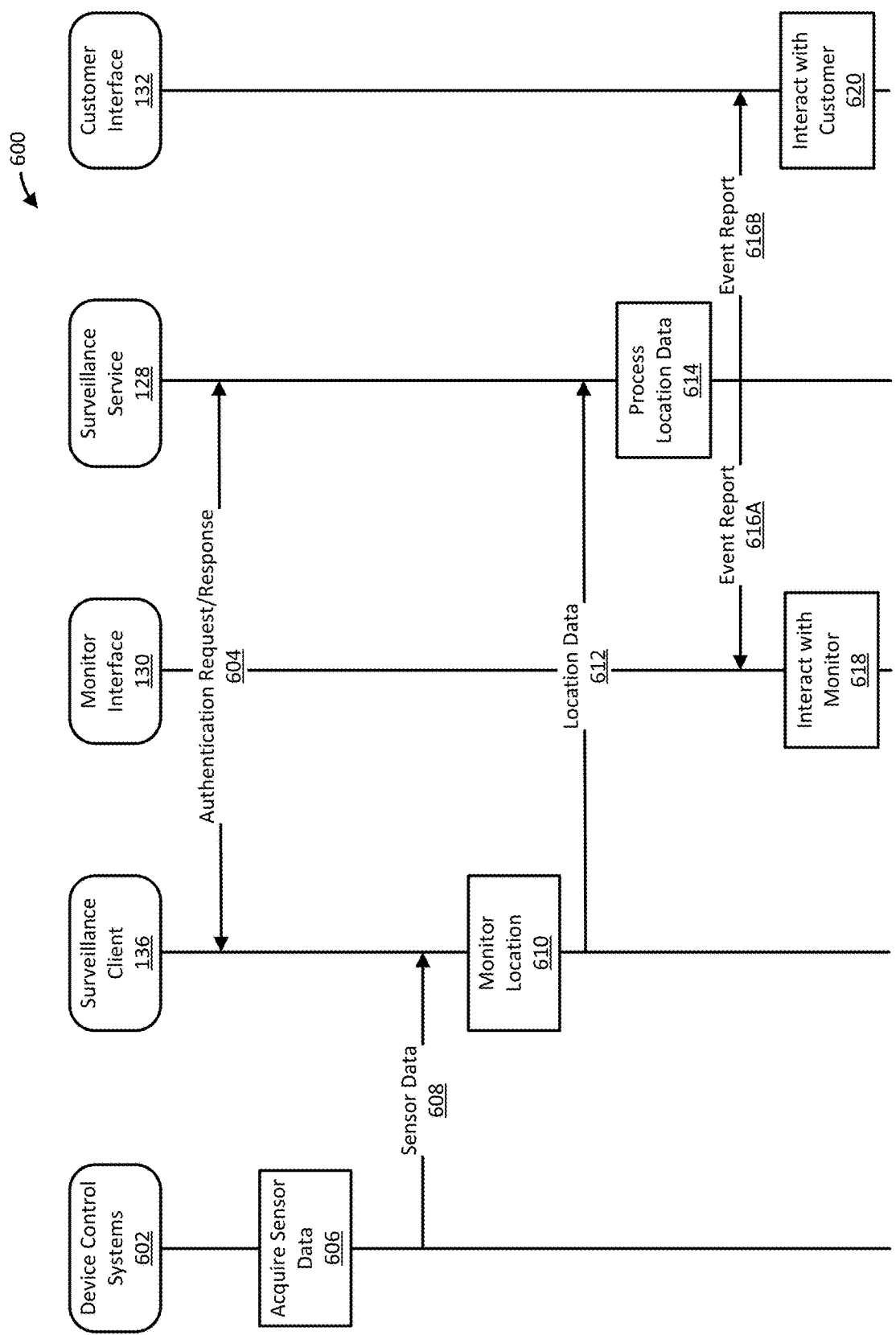
FIG. 6 is a sequence diagram of a monitoring process, according to some examples described herein.

Turning now to FIG. 6, a monitoring process 600 is illustrated as a sequence diagram. The process 600 can be executed, in some examples, by a security system (e.g., the security system 100 of FIG. 1). More specifically, in some examples, at least a portion of the process 600 is executed by one or more location-based devices (e.g., the devices 104-112 of FIG. 1) under the control of device control system (DCS) code (e.g., either the code 308 or 408) implemented by at least one processor (e.g., either of the processors 300 or 400 of FIG. 3 or 4). The DCS code can include, for example, a camera agent (e.g., the camera agent 138 of FIG. 1). At least a portion of the process 600 is executed by a base station (e.g., the base station 114 of FIG. 1) under control of a surveillance client (e.g., the surveillance client 136 of FIG. 1). At least a portion of the process 600 is executed by a monitoring center environment (e.g., the monitoring center environment 120 of FIG. 1) under control of a monitor interface (e.g., the monitor interface 130 of FIG. 1). At least a portion of the process 600 is executed by a data center environment (e.g., the data center environment 124 of FIG. 1) under control of a surveillance service (e.g., the surveillance service 128 of FIG. 1) or under control of transport services (e.g., the transport services 126 of FIG. 1). At least a portion of the process 600 is executed by a customer device (e.g., the customer device 122 of FIG. 1) under control of a customer interface (e.g., customer interface 132 of FIG. 1).

As shown in FIG. 6, the process 600 starts with the surveillance client 136 authenticating with the surveillance service 128 by exchanging one or more authentication requests and responses 604 with the surveillance service 128. More specifically, in some examples, the surveillance client 136 communicates an authentication request to the surveillance service 128 via one or more API calls to the surveillance service 128. In these examples, the surveillance service 128 parses the authentication request to extract security credentials therefrom and passes the security credentials to an identity provider (e.g., the identity provider 512 of FIG. 5) for authentication. In some examples, if the identity provider authenticates the security credentials, the surveillance service 128 generates a security token and communicates the security token as a payload within an authentication response to the authentication request. In these examples, if the identity provider is unable to authenticate the security credentials, the surveillance service 128 generates an error code and communicates the error code as the payload within the authentication response to the authentication request. Upon receipt of the authentication response, the surveillance client 136 parses the authentication response to extract the payload. If the payload includes the error code, the surveillance client 136 can retry authentication and/or interoperate with a user interface of its host device (e.g., the user interface 212 of the base station 114 of FIG. 2) to render output indicating the authentication failure. If the payload includes the security token, the surveillance client 136 stores the security token for subsequent use in communication of location data. It should be noted that the security token can have a limited lifespan (e.g., 1 hour, 1 day, 1 week, 1 month, etc.) after which the surveillance client 136 may be required to reauthenticate with the surveillance service 128.

Continuing with the process 600, one or more DCSs 602 hosted by one or more location-based devices acquire 606 sensor data descriptive of a location (e.g., the location 102A of FIG. 1). The sensor data acquired can be any of a variety of types, as discussed above with reference to FIGS. 1-4. In some examples, one or more of the DCSs 602 acquire sensor data continuously. In some examples, one or more of the DCSs 602 acquire sensor data in response to an event, such as expiration of a timer (a push event) or receipt of an acquisition polling signal communicated by the surveillance client 136 (a poll event). In certain examples, one or more of the DCSs 602 stream sensor data to the surveillance client 136 with minimal processing beyond acquisition and digitization. In these examples, the sensor data may constitute a sequence of vectors with individual vector members including a sensor reading and a timestamp. Alternatively or additionally, in some examples, one or more of the DCSs 602 execute additional processing of sensor data, such as generation of one or more summaries of multiple sensor readings. Further still, in some examples, one or more of the DCSs 602 execute sophisticated processing of sensor data. For instance, if the security sensor includes an image capture device, the security sensor may execute image processing routines such as edge detection, motion detection, facial recognition, threat assessment, reportable event generation, recommended zone identification, filter zone redaction, and zone relocation. For instance, in at least one example, code (e.g., the code 408 of FIG. 4A) stored in an image capture device (e.g., the image capture device 110 of FIG. 1) instructs a processor (e.g., the processor 400) to redact pixels from acquired frames that fall within one or more filter zones defined by zone configuration data (e.g., the data store 410 of FIG. 4A) stored locally in the device. In these examples, the security system benefits from redaction of filter zones at the source device, thereby preventing needless downstream storage, transmission, and processing of redacted image data.

Continuing with the process 600, the DCSs 602 communicate the sensor data 608 to the surveillance client 136. As with sensor data acquisition, the DCSs 602 can communicate the sensor data 608 continuously or in response to an event, such a push event (originating with the DCSs 602) or a poll event (originating with the surveillance client 136).

Continuing with the process 600, the surveillance client 136 monitors 610 the location by processing the received sensor data 608. For instance, in some examples, the surveillance client 136 executes one or more image processing routines. These image processing routines may include any of the image processing routines described above with reference to the operation 606. By distributing at least some of the image processing routines between the DCSs 602 and surveillance clients 136, some examples decrease power consumed by battery-powered devices by off-loading processing to line-powered devices. Moreover, in some examples, the surveillance client 136 may execute an ensemble threat detection process that utilizes sensor data 608 from multiple, distinct DCSs 602 as input. For instance, in at least one example, the surveillance client 136 will attempt to corroborate an open state received from a contact sensor with motion and facial recognition processing of an image of a scene including a window to which the contact sensor is affixed. If two or more of the three processes indicate the presence of an intruder, the threat score is increased and or a break-in event is declared, locally recorded, and communicated. Other processing that the surveillance client 136 may execute includes outputting local alerts (e.g., in response to detection of particular events and/or satisfaction of other criteria) and detection of maintenance conditions for location-based devices, such as a need to change or recharge low batteries and/or replace/maintain the devices that host the DCSs 602. Any of the processes described above within the operation 610 may result in the creation of location data that specifies the results of the processes.

Continuing with the process 600, the surveillance client 136 communicates the location data 612 to the surveillance service 128. As with sensor data 608 communication, the surveillance client 136 can communicate the location data 612 continuously or in response to an event, such as a push event (originating with the surveillance client 136) or a poll event (originating with the surveillance service 128).

Continuing with the process 600, the surveillance service 128 processes 614 received location data. For instance, in some examples, the surveillance service 128 executes one or more routines described above with reference to the operations 606 and/or 610. Additionally or alternatively, in some examples, the surveillance service 128 calculates a threat score or further refines an existing threat score using historical information associated with the location identified in the location data and/or other locations geographically proximal to the location (e.g., within the same zone improvement plan (ZIP) code). For instance, in some examples, if multiple break-ins have been recorded for the location and/or other locations within the same ZIP code, the surveillance service 128 may increase a threat score calculated by a DCS 602 and/or the surveillance client 136. In some examples, the surveillance service 128 determines by applying a set of rules and criteria to the location data 612 whether the location data 612 includes any reportable events and, if so, communicates an event report 616A and/or 616B to the monitor interface 130 and/or the customer interface

132. A reportable event may be an event of a certain type (e.g., break-in) or an event of a certain type that satisfies additional criteria (e.g., movement within a particular zone combined with a threat score that exceeds a threshold value). The event reports 616A and/or 616B may have a priority based on the same criteria used to determine whether the event reported therein is reportable or may have a priority based on a different set of criteria or rules.

Continuing with the process 600, the monitor interface 130 interacts 618 with monitoring personnel through, for example, one or more GUIs. These GUIs may provide details and context regarding one or more reportable events. The GUIs may also enable monitoring personnel to configure and/or otherwise work with zones. Examples of such GUIs are described further below with reference to FIGS. 10 and 11.

Continuing with the process 600, the customer interface 132 interacts 620 with at least one customer through, for example, one or more GUIs. These GUIs may provide details and context regarding one or more reportable events. The GUIs may also enable a customer to configure and/or otherwise work with zones. Examples of such GUIs are described further below with reference to FIGS. 10 and 11.

It should be noted that the processing of sensor data and/or location data, as described above with reference to the operations 606, 610, and 614, may be executed by processors disposed within various parts of the system 100. For instance, in some examples, the DCSs 602 execute minimal processing of the sensor data (e.g., acquisition and streaming only) and the remainder of the processing described above is executed by the surveillance client 136 and/or the surveillance service 128. This approach may be helpful to prolong battery runtime of location-based devices. In other examples, the DCSs 602 execute as much of the sensor data processing as possible, leaving the surveillance client 136 and the surveillance service 128 to execute only processes that require sensor data that spans location-based devices and/or locations. This approach may be helpful to increase scalability of the system 100 with regard to adding new locations.

Figure 7:
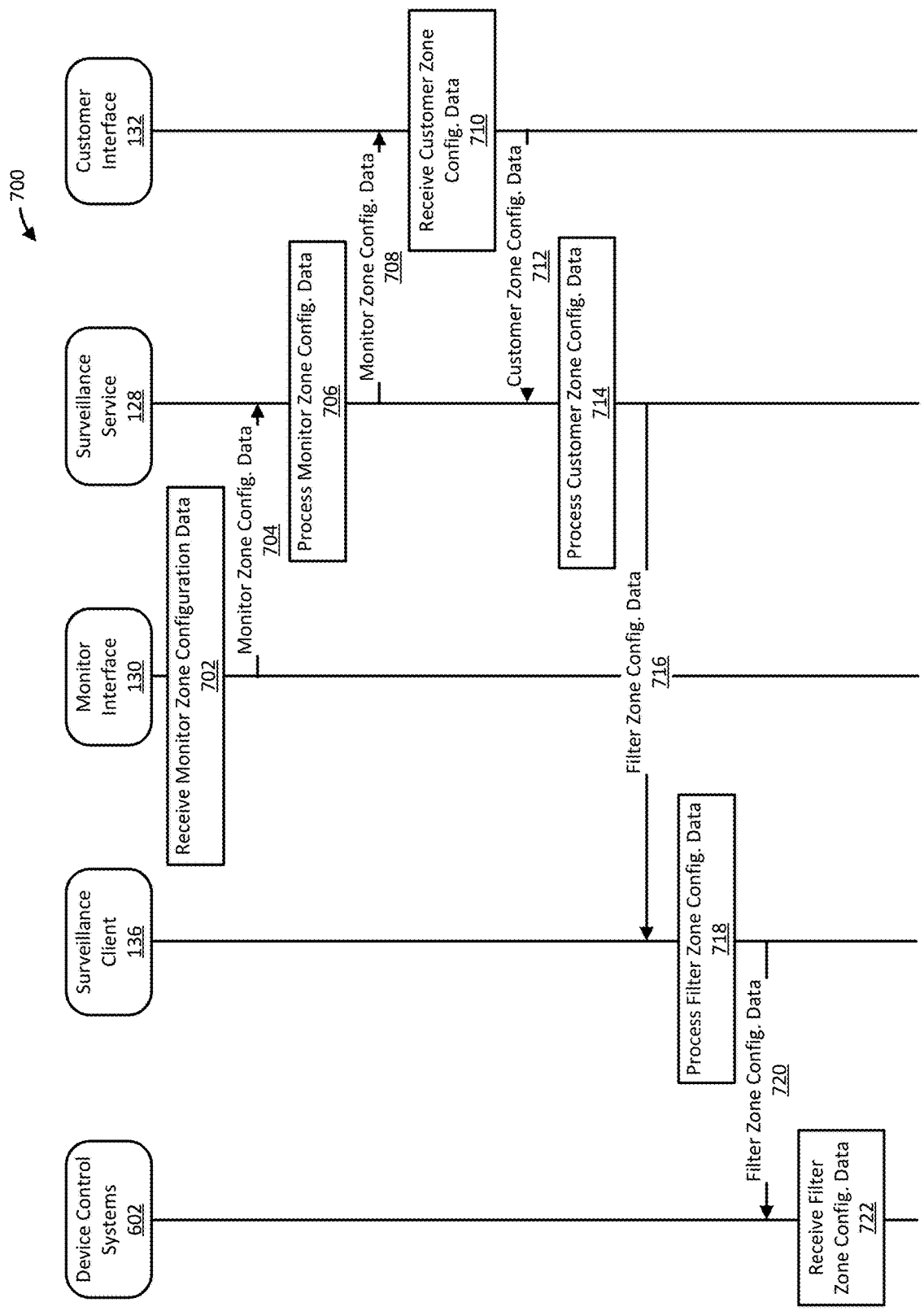
FIG. 7 is a sequence diagram of a zone configuration process, according to some examples described herein.

Turning now to FIG. 7, a configuration process 700 is illustrated as a sequence diagram. The process 700 can be executed, in some examples, by a security system (e.g., the security system 100 of FIG. 1). More specifically, in some examples, at least a portion of the process 700 is executed by one or more location-based devices (e.g., the devices 104-112 of FIG. 1) under the control of device control system (DCS) code (e.g., either the code 308 or 408) implemented by at least one processor (e.g., either of the processors 300 or 400 of FIG. 3 or 4). At least a portion of the process 700 is executed by a base station (e.g., the base station 114 of FIG. 1) under control of a surveillance client (e.g., the surveillance client 136 of FIG. 1). At least a portion of the process 700 is executed by a monitoring center environment (e.g., the monitoring center environment 120 of FIG. 1) under control of a monitor interface (e.g., the monitor interface 130 of FIG. 1). At least a portion of the process 700 is executed by a data center environment (e.g., the data center environment 124 of FIG. 1) under control of a surveillance service (e.g., the surveillance service 128 of FIG. 1). At least a portion of the process 700 is executed by a customer device (e.g., the customer device 122 of FIG. 1) under control of a customer interface (e.g., customer interface 132 of FIG. 1).

As shown in FIG. 7, the process 700 starts with the monitor interface 130 receiving 702 monitor zone configuration data. For instance, in some examples, the monitor interface 130 renders a zone configuration screen, such as the zone configuration screen 1000 illustrated below with reference to FIG. 10. In these examples, the monitor interface 130 receives input specifying the zone configuration data via interactions between a user (e.g., monitoring personnel) and the zone configuration screen. The zone configuration data can include, for example, one or more fields that identify pixels within a frame of image data that are included in the zone; data specifying a name of the zone; a description of the zone; notes regarding the zone; a type of the zone (e.g., filter, non-filter, intruder, etc.); an approval status of the zone (monitor-approved, customer-approved, unapproved, etc.); and one or more identifiers of one or more image capture devices to which the zone applies. In at least one example, the received monitor zone configuration data specifies that the zone is a monitor zone and that the zone is a filter zone.

Continuing with the process 700, the monitor interface 130 communicates monitor zone configuration data 704 to the surveillance service 128. For instance, in some examples, the monitor interface 130 transmits the monitor zone configuration data 704 to the surveillance service 128 via one or more API calls supported by the surveillance service 128.

Continuing with the process 700, the surveillance service 128 processes 706 the monitor zone configuration data 704. For instance, in some examples, the surveillance service 128 extracts the monitor zone configuration data 704 during processing of the API calls and stores the monitor zone configuration data 704 in a zone data store (e.g., the zone data store 506 of FIG. 5).

Continuing with the process 700, the surveillance service 128 communicates monitor zone configuration data 708 to the customer interface 132. For instance, in some examples, the surveillance service 128 transmits the monitor zone configuration data 708 to the customer interface 132 via one or more API calls supported by the customer interface 132.

Continuing with the process 700, the customer interface 132 processes 710 the monitor zone configuration data 708. For instance, in some examples, the customer interface 132 extracts the monitor zone configuration data 708 during processing of the API calls, stores the monitor zone configuration data 708 in a local data store, and renders content based on the monitor zone configuration data 708 within a zone configuration GUI, such as the zone configuration screen 1000 described below with reference to FIG. 10. Further, within the operation 710, the customer interface 132 interacts with a user (e.g., a customer) to generate customer zone configuration data based on the monitor zone configuration data 708 and input received from the user. The customer zone configuration data may include, for example, data indicating that the user approved of the monitor zone defined by the monitor zone configuration data, thus promoting the monitor zone to a customer zone.

Continuing with the process 700, the customer interface 132 communicates customer zone configuration data 712 to the surveillance service 128. For instance, in some examples, the customer interface 132 transmits the customer zone configuration data 712 to the surveillance service 128 via one or more API calls supported by the surveillance service 128.

Continuing with the process 700, the surveillance service 128 processes 714 the customer zone configuration data 712. For instance, in some examples, the surveillance service 128 extracts the customer zone configuration data 712 during processing of the API calls and stores the customer zone configuration data 712 in the zone data store. Further, in examples in which the surveillance client 136 and/or the DCSs 602 redact pixels from image data within filter zones, the surveillance service 128 communicates filter zone configuration data 716 to the surveillance client 136. For instance, in some examples, the surveillance service 128 transmits the filter zone configuration data 716 to the surveillance client 136 via one or more API calls supported by the surveillance client 136.

Continuing with the process 700, the surveillance client 136 processes 718 the filter zone configuration data 716. For instance, in some examples, the surveillance client 136 extracts the filter zone configuration data 716 during processing of the API calls and stores the filter zone configuration data 716 in a local data store. Further, in examples in which the DCSs 602 redact pixels from image data within filter zones, the surveillance client 136 communicates filter zone configuration data 720 to the DCSs 602 that control image capture devices. For instance, in some examples, the surveillance service 128 transmits the filter zone configuration data 720 to the DCSs 602 via one or more API calls supported by the DCSs 602.

Continuing with the process 700, the DCSs 602 process 722 the filter zone configuration data 720. For instance, in some examples, the DCSs 602 extract the filter zone configuration data 720 during processing of the API calls and store the filter zone configuration data 720 in a local data store (e.g., the data store 410 of FIG. 4A). In this way, the DCSs 602 are prepared to redact image data prior to its local storage or communication to the surveillance client 136.

Figure 8:
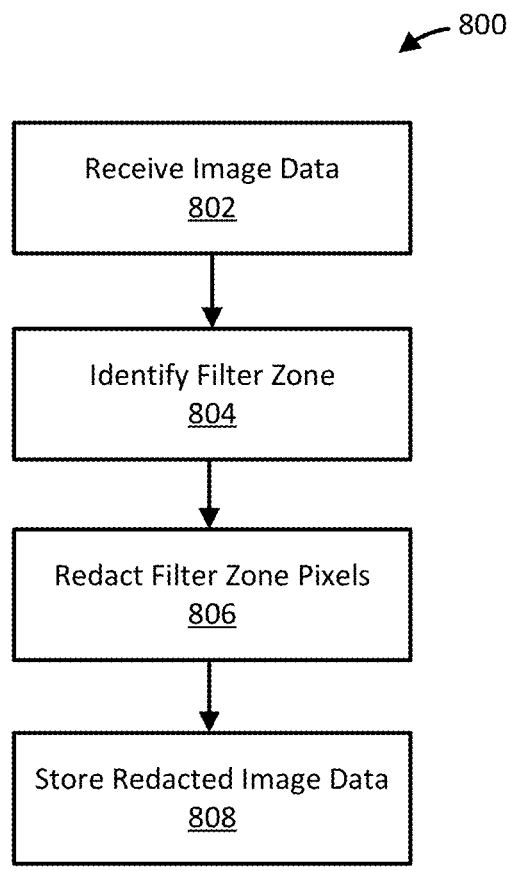
FIG. 8 is a flow diagram of a filter zone redaction process, according to some examples described herein.

Turning now to FIG. 8 a zone redaction process 800 is illustrated as a flow diagram. The process 800 can be executed, in some examples, by a security system (e.g., the security system 100 of FIG. 1). More specifically, in some examples, the process 800 is executed by one or more location-based image capture devices (e.g., the devices 104 or 110 of FIG. 1) under the control of DCS code (e.g., the code 408) implemented by at least one processor (e.g., the processor 400 of FIG. 4A). Alternatively or additionally, in some examples, the process 800 is executed by a base station (e.g., the base station 114 of FIG. 1) under control of a surveillance client (e.g., the surveillance client 136 of FIG. 1). Alternatively or additionally, in some examples, the process 800 is executed by a monitoring center environment (e.g., the monitoring center environment 120 of FIG. 1) under control of a monitor interface (e.g., the monitor interface 130 of FIG. 1). Alternatively or additionally, in some examples, the process 800 is executed by a data center environment (e.g., the data center environment 124 of FIG. 1) under control of a surveillance service (e.g., the surveillance service 128 of FIG. 1). Alternatively or additionally, in some examples, the process 800 is executed by a customer device (e.g., the customer device 122 of FIG. 1) under control of a customer interface (e.g., customer interface 132 of FIG. 1). As such, "the processor" in the following description of the process 800 can be any of the processors referred to above.

As illustrated in FIG. 8, the process 800 starts with the processor receiving 802 image data. For instance, in examples where the processor resides in an image capture device, the processor acquires the image data from image capture circuitry included in the image capture device (e.g., the sensor 420 of FIG. 4A). In examples where the processor resides in a base station, the processor receives the image data from one or more communications from a DCS executing on an image capture device. In examples where the processor resides in a data center environment, the processor receives the image data from one or more communications from a surveillance client executing on a base station. In examples where the processor resides in a monitoring center environment or a customer device, the processor receives the image data from one or more communications from a surveillance service executing in a data center environment.

Continuing with the process 800, the processor identifies 804 one or more filter zone definitions. For instance, in some examples where the processor resides in an image capture device, the processor identifies the one or more filter zone definitions by retrieving the one or more filter zone definitions from a local data structure (e.g., stored in the data store 410 of FIG. 4A). If the image capture device supports multiple fields of view (e.g., a wide view, a zoom view, etc.), the data structure may associate filter zone definitions with identifiers of the supported fields of view. In this implementation, the processor identifies the one or more filter zone definitions by retrieving, from the data structure, one or more filter zone definitions associated with a field of view that matches a field of view of the image data received in the operation 802. The processor may match the field of view of one or more filter zone definitions with the field of view of the image data by comparing identifiers of the fields of view. In some examples where the processor resides in a base station, a data center environment, a monitoring center environment, or a customer device, the processor identifies the one or more filter zone definitions by retrieving, from a data structure (e.g., the data store 210 of FIG. 2, or the zone data store 506 of FIG. 5), one or more filter zone definitions of an image capture device and/or a field of view that matches an image capture device and/or a field of view of the image data received in the operation 802. The processor may match the image capture device and/or the field of view of one or more filter zone definitions with the image capture device and/or the field of view of the image data by comparing identifiers of the image capture device and/or the fields of view. It should be noted that the identifiers compared by the processor in these implementations may each be a single identifier (e.g., a globally unique identifier or GUID) that uniquely identifies an image capture device, a field of view, or a unique combination of image capture device and field of view. In some examples where the processor resides in a data center environment, a monitoring center environment, or a customer device, the processor identifies the one or more filter zone definitions by retrieving, from a data structure (e.g., the zone data store 506 of FIG. 5), one or more filter zone definitions associated with a location, an image capture device, and/or a field of view that match a location, an image capture device, and/or a field of view of the image data received in the operation 802. The processor may match the location, the image capture device, and/or the field of view associated with one or more filter zone definitions with the location, the image capture device and/or the field of view of the image data by comparing identifiers of the location, the image capture device, and/or the fields of view. It should be noted that the identifiers compared by the processor in these implementations may each be a single identifier (e.g., a globally unique identifier or GUID) that uniquely identifies a location/base station, an image capture device, a field of view, or a unique combination of location, image capture device, and field of view.

Continuing with the process 800, the processor redacts 806 pixels within the image data that fall within the filter zone. For instance, in some examples, the processor redacts the pixels by overwriting them with a default color or pattern. In other examples, the processor redefines the frame to exclude the pixels, thus decreasing the amount of storage space required by the frame.

Continuing with the process 800, the processor stores 808 the redacted image data in data storage accessible to the processor. Subsequent to the operation 808, the process 800 ends.

Figure 9:
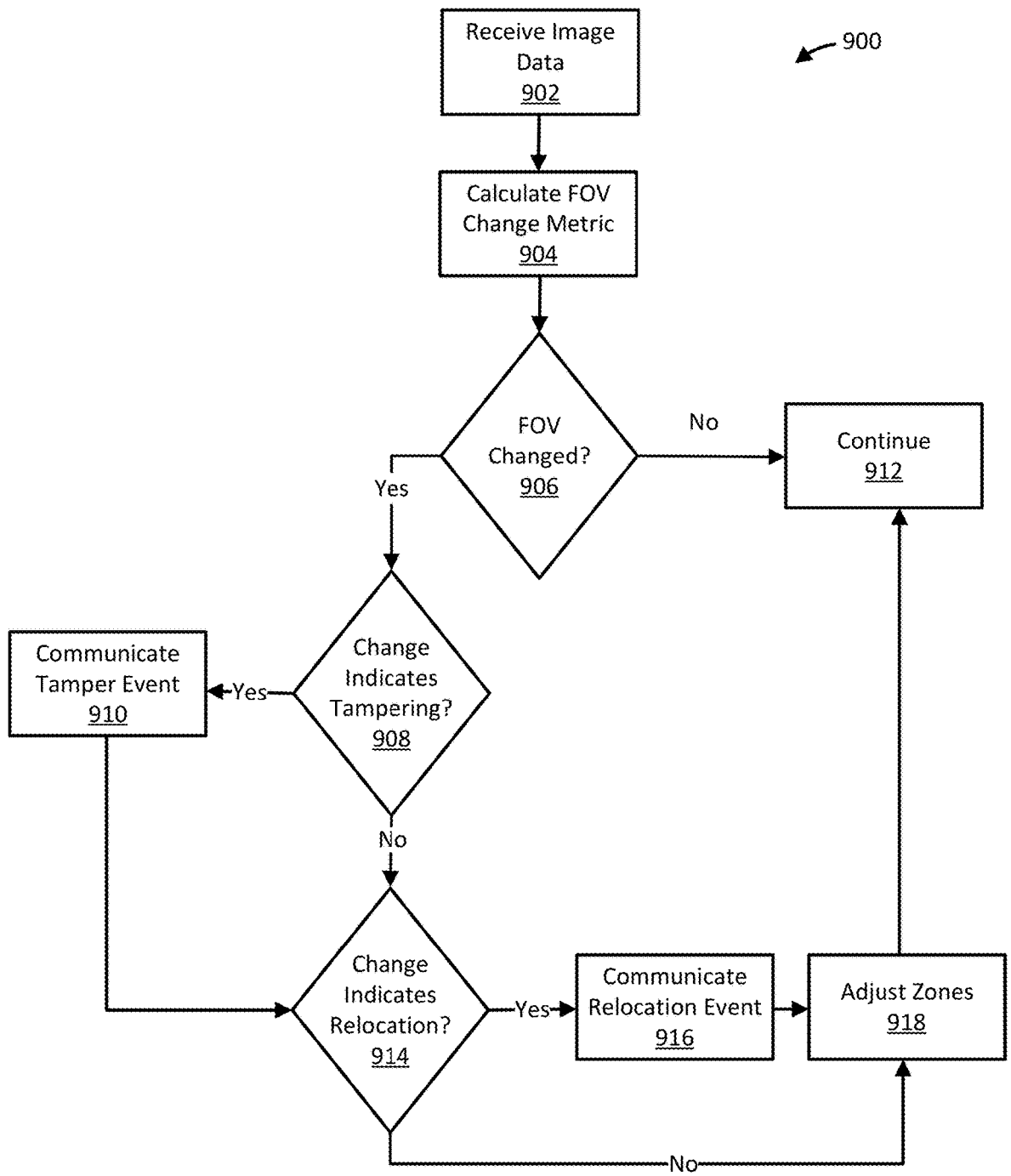
FIG. 9 is a flow diagram of a zone relocation process, according to some examples described herein.

Turning now to FIG. 9 a zone relocation process 900 is illustrated as a flow diagram. The process 900 can be executed, in some examples, by a security system (e.g., the security system 100 of FIG. 1). More specifically, in some examples, the process 900 is executed by one or more location-based image capture devices (e.g., the devices 104 or 110 of FIG. 1) under the control of at least one processor (e.g., the processor 400 of FIG. 4A) instructed by DCS code (e.g., the code 408). Alternatively or additionally, in some examples, the process 900 is executed by a base station (e.g., the base station 114 of FIG. 1) under control of a surveillance client (e.g., the surveillance client 136 of FIG. 1). Alternatively or additionally, in some examples, the process 900 is executed by a monitoring center environment (e.g., the monitoring center environment 120 of FIG. 1) under control of a monitor interface (e.g., the monitor interface 130 of FIG. 1). Alternatively or additionally, in some examples, the process 900 is executed by a data center environment (e.g., the data center environment 124 of FIG. 1) under control of a surveillance service (e.g., the surveillance service 128 of FIG. 1). Alternatively or additionally, in some examples, the process 900 is executed by a customer device (e.g., the customer device 122 of FIG. 1) under control of a customer interface (e.g., customer interface 132 of FIG. 1). As such, "the processor" in the following description of the process 900 can be any of the processors referred to above.

As illustrated in FIG. 9, the process 900 starts with a processor receiving 902 image data. For instance, in examples where the processor resides in the image capture device, the processor acquires the image data from image capture circuitry included in the image capture device (e.g., the sensor 420 of FIG. 4A). In examples where the processor resides in a base station, the processor receives the image data from one or more communications generated by a DCS hosted by an image capture device. In examples where the processor resides in a data center environment, the processor receives the image data from one or more communications generated by a surveillance client hosted by a base station. In examples where the processor resides in a monitoring center environment or a customer device, the processor receives the image data from one or more communications generated by a surveillance service executing in a data center environment. Regardless of where the processor resides, in some examples, the processor stores the received image data in a local data store.

Continuing with the process 900, the processor calculates 904 one or more metrics indicative of an amount of change in the FOV of the image capture device. For instance, in some examples, the processor calculates the one or more FOV change metrics using the current image data (or one or more portions thereof) received in the operation 902 and image data (or one or more portions thereof) previously received and processed via the process 900. In some examples, the current image data and the previous image data are image frames adjacent to one another in a sequence of frames. In certain examples, to calculate the change metrics, the processor identifies one or more current locations of one or more anchor pixels within the current image data and determines one or more differences (e.g., in pixel distance) between the current locations and one or more previous locations of the one or more anchor pixels in the previous image data. In these examples, the one or more differences (or one or more summaries thereof) are the one or more change metrics. In certain examples, the one or more anchor pixels are recorded in a local data store as part of image capture device installation, for example once the FOV of the image capture device is established. In some examples, one or more anchor pixels are recorded as part of zone configuration, to mark zone boundaries. In some examples, the one or more anchor pixels are autonomously selected. For instance, in at least one example, anchor pixels are selected by the processor based on semantic regions in an FOV. In these examples, the processor selects one or more anchor pixels to cover portions of semantic regions associated with physical objects that don't move substantially under normal conditions, such as large trees, buildings, street signs, and the like.

Continuing with the process 900, the processor determines 906 whether the FOV of the image capture device changed. For instance, in some examples, the processor compares the one or more change metrics to one or more threshold values and determines that the FOV changed if the one or more change metrics exceed the one or more threshold values. In some examples, the threshold values are configurable values tuned to be transgressed where, for example, a predefined percentage of the anchor pixels (e.g., 10%, 20%, 30%, 40%, 50%, or more) change positions within the FOV. If the processor determines that the one or more change metrics indicate an FOV change, the processor proceeds to operation 908. If the processor determines that the one or more change metrics do not indicate an FOV change, the processor proceeds to operation 912.

Continuing with the process 900, the processor determines 908 whether the one or more change metrics indicate that the image capture device was subject to tampering. For instance, in some examples, the processor compares the one or more change metrics to one or more tamper threshold values and determines that the image capture device was tampered with if the one or more change metrics exceed one or more tamper threshold values. In some examples, the tamper threshold values are configurable values tuned to be transgressed where, for example, an agent or customer defined zone is partially to totally obscured (e.g., unable to be observed) and/or where, for example, a predefined percentage of anchor pixels (e.g., 10%, 20%, 30%, 40%, 50%, or more) are obscured. If the processor determines that the one or more change metrics indicate tampering, the processor proceeds to operation 910. If the processor determines that the one or more change metrics do not indicate tampering, the processor proceeds to operation 914.

Continuing with the process 900, the processor communicates 910 a tamper event. For instance, in examples where the processor resides in an image capture device, the processor records the tamper event in a local data store and communicates the tamper event to a processor residing in a base station and hosting a surveillance client. In these examples, the system relays (e.g., via the network 118, the transport services 126, the surveillance service 128, the monitoring center environment 120, and/or the customer device 122 of FIG. 1) the tamper event to a processor hosting a monitor interface or customer interface. In examples where the processor resides in a base station, the processor records the tamper event in a local data store and communicates the tamper event to a processor residing in a data center environment and hosting the surveillance service. In these examples, the system relays (e.g., via the network 118, the monitoring center environment 120, and/or the customer device 122 of FIG. 1) the tamper event to a processor hosting a monitor interface or customer interface. In examples where the processor resides in a data center environment, the processor records the tamper event in a local data store and communicates (e.g., via the network 118) the tamper event to one or more of a processor residing in a monitoring center environment and hosting a monitor interface or a processor residing in a customer device and hosting a customer interface. Upon receipt of a tamper event, a processor hosting a monitor interface or a customer interface may control its resident device to output a notification of the tamper event via a user interface. This notification can take the form of an email, text, and/or rendering of a user interface screen (e.g., the event investigation screen 1100 described below with reference to FIG. 11), among other notifications.

Continuing with the process 900 the processor determines 914 whether the one or more change metrics indicate that the FOV of the image capture device was relocated in a manner that does not inhibit operation of the image capture device. For instance, in some examples, the processor compares the one or more change metrics to one or more relocation threshold values and determines that the image capture device was relocated if the one or more change metrics exceed one or more relocation threshold values. In some examples, the relocation threshold values are configurable values tuned to be transgressed where, for example, an agent or customer defined zone is partially to totally obscured (e.g., unable to be observed). If the processor determines that the one or more change metrics indicate relocation, the processor proceeds to operation 916. If the processor determines that the one or more change metrics do not indicate relocation, the processor proceeds to operation 918.

Continuing with the process 900, the processor communicates 916 a relocation event. For instance, in examples where the processor resides in an image capture device, the processor records the relocation event in a local data store and communicates the relocation event to a processor residing in a base station and hosting a surveillance client. In these examples, the system relays (e.g., via the network 118, the transport services 126, the surveillance service 128, the monitoring center environment 120, and/or the customer device 122 of FIG. 1) the relocation event to a processor hosting a monitor interface or customer interface. In examples where the processor resides in a base station, the processor records the relocation event in a local data store and communicates the relocation event to a processor residing in a data center environment and hosting the surveillance service. In these examples, the system relays (e.g., via the network 118, the monitoring center environment 120, and/or the customer device 122 of FIG. 1) the relocation event to a processor hosting a monitor interface or a customer interface. In examples where the processor resides in a data center environment, the processor records the relocation event in a local data store and communicates (e.g., via the network 118) the relocation event to one or more of a processor residing in a monitoring center environment and hosting a monitor interface or a processor residing in a customer device and hosting a customer interface. Upon receipt of a relocation event, a processor hosting a monitor interface or a customer interface may control its resident device to output a notification of the relocation event for approval via a user interface. This notification can take the form of an email, text, and/or rendering of a user interface screen (e.g., the zone configuration screen 1000 described below with reference to FIG. 10), among other notifications.

Continuing with the process 900, the processor adjusts 918 the positions of anchor pixels and zones within the FOV of the image capture devices by altering the configuration data of the anchor pixels and zones. For instance, in some examples, the processor applies the changes calculated in the operation 904 to the configuration data of the anchor pixels and zones, thereby moving the expected positions of the same within the next instance of image data.

Continuing with the process 900, the processor continues 912 to execute processes other than the process 900 or ceases operation.

Figure 10:
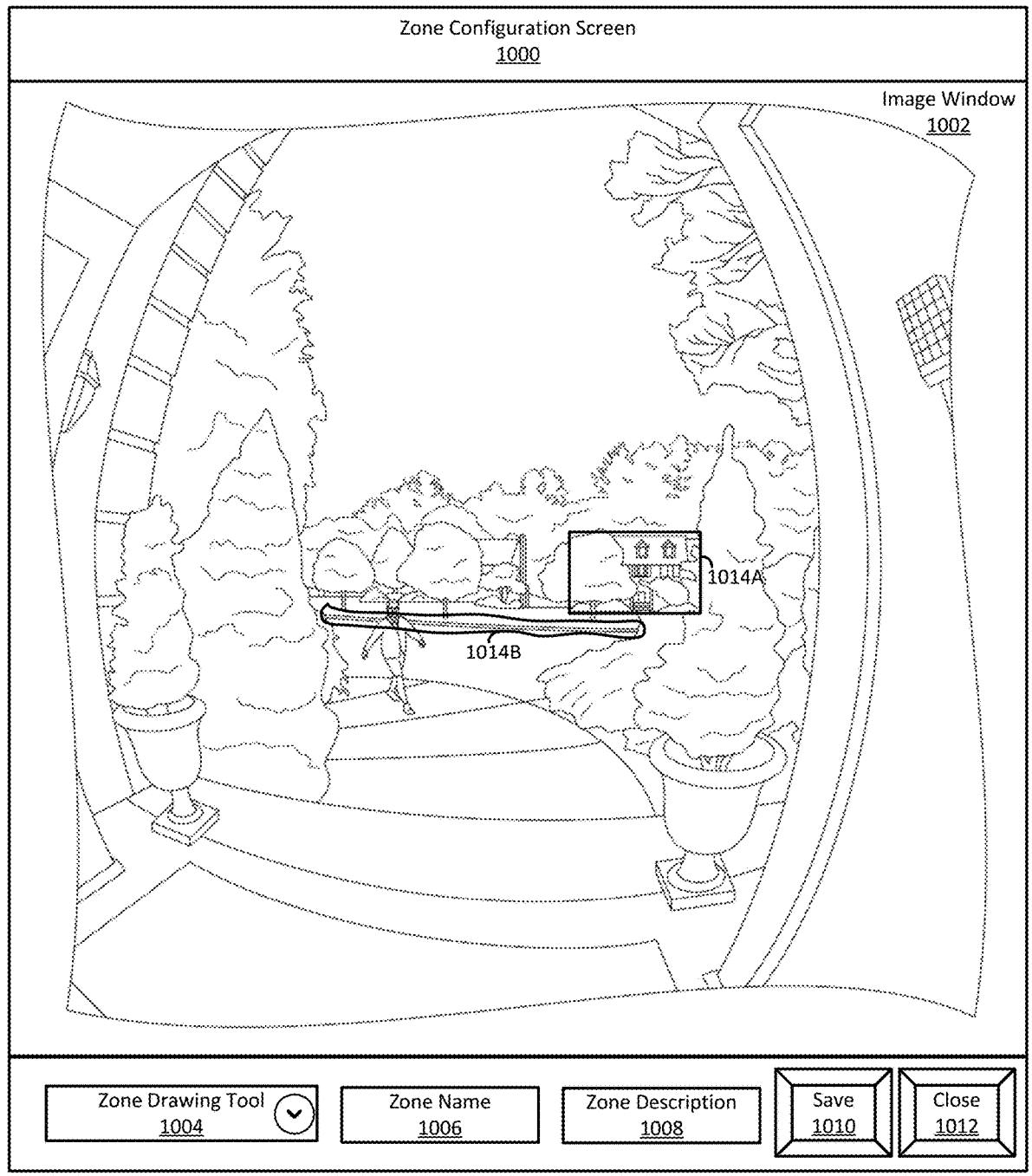
FIG. 10 is a front view of a zone configuration graphical user interface (GUI), according to some examples described herein.

Turning now to FIG. 10 a front view of a zone configuration screen 1000 is illustrated. As shown in FIG. 10, the screen 1000 includes an image window control 1002, a zone drawing tool control 1004, a zone name control 1006, a zone description control 1008, a save control 1010, and a close control 1012. Within the window control 1002, two zones 1014A and 1014B (collectively the zones 1014) are illustrated. The zones 1014 may be customer zones, monitor zones, or a mixture of the two zone types. In some examples, the monitor interface and/or the customer interface is configured to render the screen 1000 upon request. As such, in the following description, the term "screen interface" refers to the monitor interface and to the customer interface. In some examples, the screen 1000 is rendered within a browser and is served by a surveillance service (e.g., the surveillance service 128 of FIG. 1). In other examples, the screen 1000 is rendered by a native application hosted by an operating system of a computing device (the customer device 122 of FIG. 1, any of the computing devices 518 of FIG. 5, or other computing devices).

As shown in FIG. 10, the screen interface is configured to display frames of image data with the zones 1014 overlaid thereupon. The zone 1014A is a rectangle. The zone 1014B is a contour. Both of the zones 1014 may be created in response to user input within the window control 1002. For instance, in some examples, the screen interface is configured to receive input selecting a drawing tool type via the tool control 1004. Some examples of tool types of that are selectable via the tool control 1004 include line controls, circle controls, square controls, rectangle controls, and contour controls. It should be noted that any shape (e.g., regular polygons, irregular polygons, etc.) can be drawn using the tool types selectable via the tool control 1004. In some examples, the screen interface is configured to respond to selection of a particular tool type by displaying the selected drawing tool type in the tool control 1004 and rendering shapes of the selected tool type in response to input received within the window control 1002.

Continuing with the example of FIG. 10, the screen interface is configured to receive input specifying a name for a zone currently selected within the window control 1002 via the name control 1006. The screen interface is also configured to receive a description of the currently selected zone via the description control 1008. In some examples, the screen interface is configured to store zone configuration data defining the currently selected zone within a data store (e.g., the data store 506 of FIG. 5) in response to receiving input selecting the save control 1010 and to close the screen 1000 in response to receiving input selecting the close control 1012.

Figure 11:
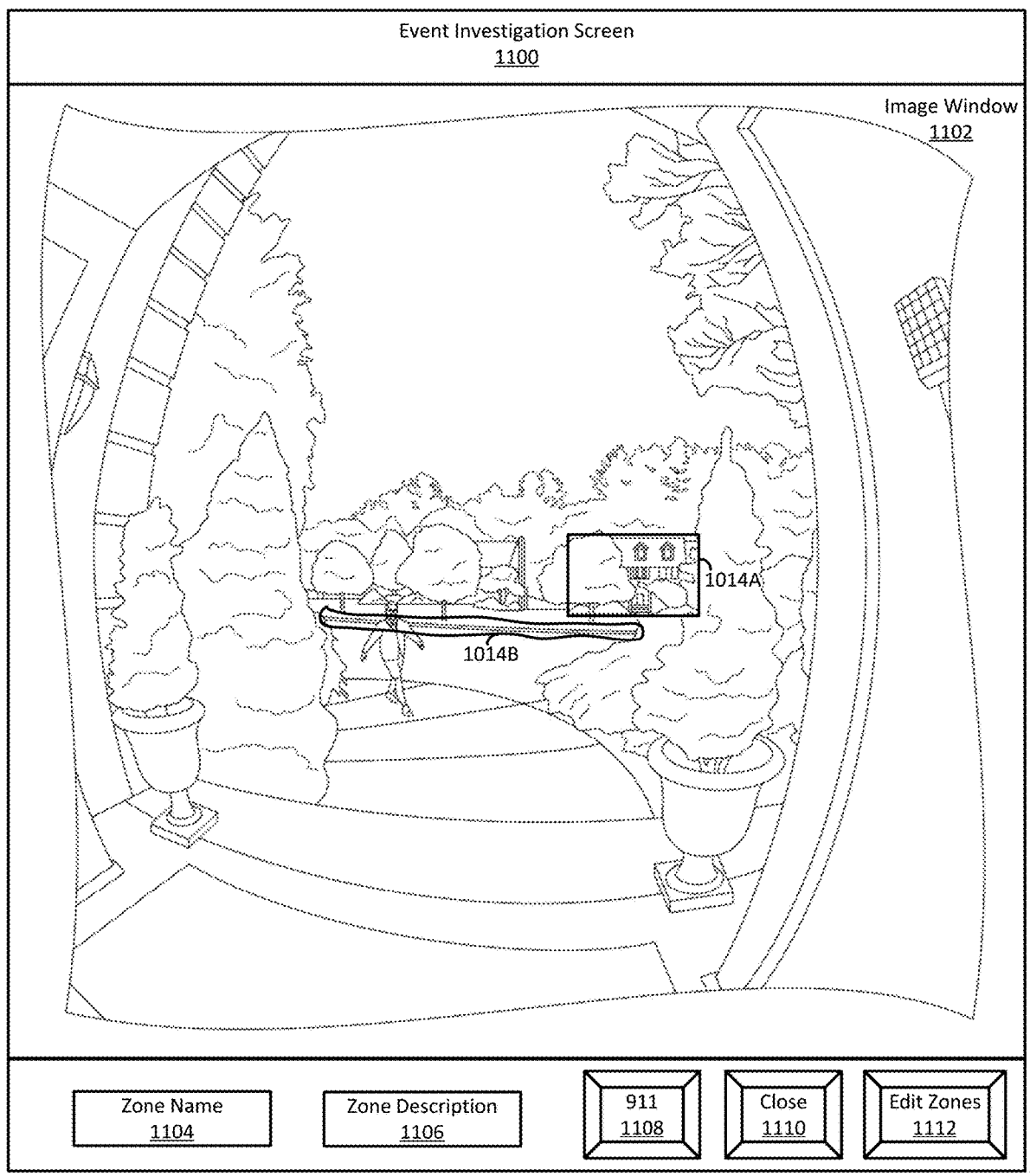
FIG. 11 is a front view of an event investigation GUI, according to some examples described herein.

Turning now to FIG. 11 a front view of an event investigation screen 1100 is illustrated. As shown in FIG. 11, the screen 1100 includes an image window control 1102, a zone name control 1104, a zone description control 1106, a report control 1108, a close control 1110, and a zone edit control 1112. Within the window control 1102, the zones 1014 are illustrated. In some examples, the monitor interface and/or the customer interface is configured to render the screen 1100 upon request. As such, in the following description, the term "screen interface" refers to the monitor interface and to the customer interface. In some examples, the screen 1100 is rendered within a browser and is served by a surveillance service (e.g., the surveillance service 128 of FIG. 1). In other examples, the screen 1100 is rendered by a native application hosted by an operating system of a computing device (the customer device 122 of FIG. 1, any of the computing devices 518 of FIG. 5, or other computing devices).

As shown in FIG. 11, the screen interface is configured to display frames of image data with the zones 1014 overlaid thereupon. In some examples, the screen interface is configured to receive input selecting or hovering over one of the zones 1014. In these examples, the screen interface is configured to display the zone name and description of the selected or hovered zone in the name control 1104 and the description control 1106, respectively.

Continuing with the example of FIG. 11, the screen interface is configured to receive input selecting the report control 1108 and, in response thereto, to initiate an interactive communication session (e.g., a telephone call) to emergency services for the location from which the image data was received. In certain examples, the screen interface is configured to receive input selecting the close control 1110 and, in response thereto, to close the screen 1100. In some examples, the screen interface is configured to receive input selecting the edit control 1112 and, in response thereto, to render the screen 1000 of FIG. 10.

Figure 12:
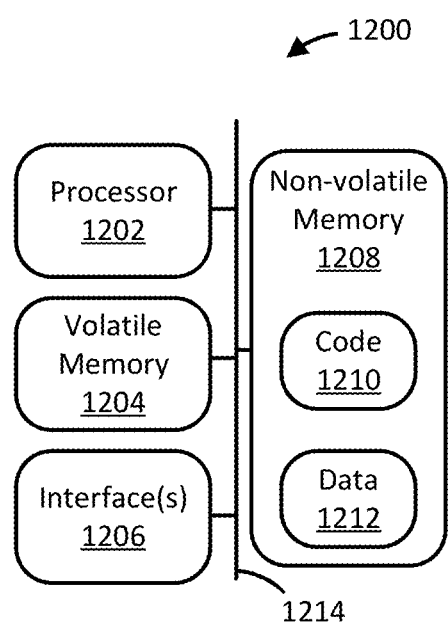
FIG. 12 is a schematic diagram of a computing device, according to some examples described herein.

Turning now to FIG. 12, a computing device 1200 is illustrated schematically. As shown in FIG. 12, the computing device includes at least one processor 1202, volatile memory 1204, one or more interfaces 1206, non-volatile memory 1208, and an interconnection mechanism 1214. The non-volatile memory 1208 includes code 1210 and at least one data store 1212.

In some examples, the non-volatile (non-transitory) memory 1208 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 1210 stored in the non-volatile memory can include an operating system and one or more applications or programs that are configured to execute under the operating system. Alternatively or additionally, the code 1210 can include specialized firmware and embedded software that is executable without dependence upon a commercially available operating system. Regardless, execution of the code 1210 can result in manipulated data that may be stored in the data store 1212 as one or more data structures. The data structures may have fields that are associated through location in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing the example of FIG. 12, the processor 1202 can be one or more programmable processors to execute one or more executable instructions, such as a computer program specified by the code 1210, to control the operations of the computing device 1200. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 1204) and executed by the circuitry. In some examples, the processor 1202 is a digital processor, but the processor 1202 can be analog, digital, or mixed. As such, the processor 1202 can execute the function, operation, or sequence of operations using digital values and/or using analog signals. In some examples, the processor 1202 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 1202 that are multicore can provide functionality for parallel, simultaneous execution of instructions or for parallel, simultaneous execution of one instruction on more than one piece of data.

Continuing with the example of FIG. 12, prior to execution of the code 1210 the processor 1202 can copy the code 1210 from the non-volatile memory 1208 to the volatile memory 1204. In some examples, the volatile memory 1204 includes one or more static or dynamic random-access memory (RAM) chips and/or cache memory (e.g. memory disposed on a silicon die of the processor 1202). Volatile memory 1204 can offer a faster response time than a main memory, such as the non-volatile memory 1208.

Through execution of the code 1210, the processor 1202 can control operation of the interfaces 1206. The interfaces 1206 can include network interfaces. These network interfaces can include one or more physical interfaces (e.g., a radio, an ethernet port, a USB port, etc.) and a software stack including drivers and/or other code 1210 that is configured to communicate with the one or more physical interfaces to support one or more LAN, PAN, and/or WAN standard communication protocols. The communication protocols can include, for example, TCP and UDP among others. As such, the network interfaces enable the computing device 1200 to access and communicate with other computing devices via a computer network.

The interfaces 1206 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 1210 that is configured to communicate with the user input and/or output devices. As such, the user interfaces enable the computing device 1200 to interact with users to receive input and/or render output. This rendered output can include, for instance, one or more GUIs including one or more controls configured to display output and/or receive input. The input can specify values to be stored in the data store 1212. The output can indicate values stored in the data store 1212.

Continuing with the example of FIG. 12, the various features of the computing device 1200 described above can communicate with one another via the interconnection mechanism 1214. In some examples, the interconnection mechanism 1214 includes a communications bus.

Various inventive concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Descriptions of additional examples follow. Other variations will be apparent in light of this disclosure.

Example 1 is a method comprising receiving, from a monitor interface implemented by a first computing device, input specifying a zone to obscure a portion of a field of view of an image capture device; receiving, from the image capture device, an image acquired by the image capture device of the field of view; and communicating, to a customer interface implemented by a second computing device distinct from the first computing device, the image with the portion being obscured by the zone.

Example 2 includes the subject matter of Example 1, wherein receiving input specifying the zone comprises communicating information about the zone over a private network within a monitoring center, and communicating the information about the zone over a public network connected to the private network; and communicating the image with of the portion being obscured by the zone comprises communicating the information about the zone over the public network to the second computing device.

Example 3 includes the subject matter of Example 2, wherein the information about the zone specifies a description of the zone.

Example 4 includes the subject matter of either Example 2 or Example 3, wherein the information about the zone specifies that the zone has an irregular polygonal shape.

Example 5 includes the subject matter of any of Examples 2 through 4, further comprising receiving input, via the customer interface, requesting that the zone be stored as a customer zone.

Example 6 includes the subject matter of any of Examples 2 through 5, wherein the zone is a filter zone and the method further comprises communicating the information about the zone to the image capture device.

Example 7 includes the subject matter of Example 6, further comprising redacting, by the image capture device, image data from an acquired image, the image data falling within the zone.

Example 8 includes the subject matter of any of Examples 1 through 7, wherein the first computing device is coupled to a private network of a monitoring center, the monitor interface is a first instance of the monitor interface, and the method further comprises rendering a first representation of the zone on the first instance of the monitor interface; and rendering a second representation of the zone on a second instance of the monitor interface implemented by a third computing device coupled with the private network.

Example 9 is a method comprising displaying, via a customer interface, a recommendation for a zone that covers one or more objects identified within a field of view of an image capture device; receiving input, via the customer interface, requesting that the zone be stored as a customer zone; and communicating, to a monitor interface implemented by a computing device coupled with a private network within a monitoring center, a representation of the customer zone overlaid upon the image, thereby providing customer privacy during event processing by preventing monitoring personnel from seeing portions of the images overlaid by the representation of the customer zone.

Example 10 includes the subject matter of Example 9, wherein the image is a first image and the method further comprises acquiring, by the image capture device, a second image within the field of view of the image capture device; identifying the one or more objects within the second image; and calculating at least one metric that indicates an amount of change between the first image and the second image with reference to at least one of the customer zone and the one or more objects.

Example 11 includes the subject matter of Example 10, further comprising determining whether the field of view of the image capture device has been relocated using the at least one metric.

Example 12 includes the subject matter of either Example 10 or Example 11, further comprising determining whether the image capture device has been tampered with using the at least one metric.

Example 13 includes the subject matter of Example 12, further comprising adjusting information about the zone to generate adjusted information about the zone in response to a determination that the image capture device has been relocated.

Example 14 includes the subject matter of Example 13, further comprising determining that the at least one metric transgresses a threshold value; and rendering the adjusted information in the customer interface for approval in response to determining that the at least one metric transgresses the threshold value.

Example 15 includes the subject matter of any of Examples 9 through 14, further comprising determining a threat score with reference to the customer zone.

Example 16 includes the subject matter of any of Examples 9 through 15, further comprising identifying the one or more objects as being immobile using semantic segmentation.

Example 17 is a system comprising at least one computing device located in a data center environment and configured to receive, from a monitor interface hosted by a first computing device distinct from the at least one computing device, information specifying a zone to obscure a portion of a field of view of an image capture device; receive, from the image capture device, an image of the field of view of the image capture device; and communicate, to a customer interface implemented by a second computing device distinct from the first computing device and the at least one computing device, the image with the portion being obscured by the zone.

Example 18 includes the subject matter of Example 17, further comprising a private network connected to the at least one computing device; and the image capture device, wherein the at least one computing device is configured to communicate with the image capture device via the private network and at least one public network.

Example 19 includes the subject matter of either Example 17 or Example 18, further comprising a private network connected to the at least one computing device; and the first computing device, wherein the at least one computing device is configured to communicate with the first computing device via the private network and at least one public network.

Example 20 includes the subject matter of any of Examples 17 through 19, further comprising a private network connected to the at least one computing device, wherein the at least one computing device is configured to communicate with the second computing device via the private network and at least one public network.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

The invention claimed is:

1. A method comprising:
receiving, from a remote computing device, data that defines a recommendation for a zone in which one or more objects identified within a field of view of an image capture device are covered with a graphic when displayed;
modifying, by a mobile device in response to selection of one or more pre-sized boxes, the data to adjust the graphic to the selected one or more pre-sized boxes;
receiving input, via the mobile device customer interface, requesting that the zone be stored as a customer zone; and
communicating, to the remote computing device, from the mobile device, the graphic, thereby providing customer privacy during event processing by preventing monitoring personnel from seeing portions of the field of view overlaid by the graphic.

2. The method of claim 1, further comprising:
acquiring, by the image capture device, a first image illustrative of the field of view of the image capture device;
identifying the one or more objects in the first image;
acquiring, by the image capture device, a second image illustrative of the field of view of the image capture device;
identifying the one or more objects within the second image; and
calculating at least one metric that indicates an amount of change between the first image and the second image with reference to at least one of the customer zone or the one or more objects, the at least one metric being a distance between a pixel in the first image and a pixel in the second image.

3. The method of claim 2, further comprising determining whether the field of view of the image capture device has been relocated based on the distance between the pixel in the first image and the corresponding pixel in the second image.

4. The method of claim 2, further comprising determining whether the image capture device has been tampered with using the at least one metric.

5. The method of claim 4, further comprising adjusting the data to generate adjusted data in response to a determination that the image capture device has been relocated, wherein the adjusted data includes locations of one or more pixels in the second image.

6. The method of claim 5, further comprising:
determining that the distance transgresses a threshold value; and
rendering the adjusted data in a customer interface of the mobile device for approval of the adjusted data in response to determining that the distance transgresses the threshold value.

7. The method of claim 1, further comprising determining a threat score with reference to the customer zone.

8. The method of claim 1, further comprising identifying the one or more objects as being immobile using semantic segmentation.

9. A system comprising:
a customer computing device that is configured to
receive, from a monitor interface implemented by a monitoring center computing device coupled with a private network within a monitoring center, a recommendation for a zone that covers one or more objects identified within a field of view of an image capture device,
display, via a customer interface, the recommendation for the zone,
display, via the customer interface, one or more pre-sized boxes overlaying at least a portion of the field of view of the image capture device,
receive input, via the customer interface, modifying the zone based on selection of one or more selected pre-sized boxes of the one or more pre-sized boxes, thereby defining a modified zone, and
receive input, via the customer interface, requesting that the modified zone be stored as a customer zone; and
at least one data center environment computing device that is configured to communicate, to the monitor interface, a representation of the customer zone overlaid upon an image captured by the image capture device, wherein overlaying the customer zone upon the image prevents monitoring personnel from seeing portions of the image overlaid by the representation of the customer zone.

10. The system of claim 9, further comprising the image capture device, wherein:
the image is a first image; and
the image capture device is configured to
acquire a second image illustrative of the field of view of the image capture device,
identify the one or more objects within the second image, and calculate at least one metric that indicates change between the first image and the second image with reference to at least one of the customer zone or the one or more objects.

11. The system of claim 9, further comprising a base station, wherein:
the image is a first image; and
the base station is configured to
receive a second image illustrative of the field of view of the image capture device,
identify the one or more objects within the second image, and
calculate at least one metric that indicates change between the first image and the second image with reference to at least one of the customer zone or the one or more objects.

12. The system of claim 9, wherein:
the image is a first image; and
the monitoring center computing device is configured to:
receive a second image illustrative of the field of view of the image capture device,
identify the one or more objects within the second image, and
calculate at least one metric that indicates change between the first image and the second image with reference to at least one of the customer zone or the one or more objects.

13. The system of claim 9, wherein:
the image is a first image; and
the customer computing device is further configured to:
receive a second image illustrative of the field of view of the image capture device,
identify the one or more objects within the second image, and
calculate at least one metric that indicates change between the first image and the second image with reference to at least one of the customer zone or the one or more objects.

14. The system of claim 10, wherein the image capture device is further configured to determine whether the field of view of the image capture device has been relocated using the at least one metric.

15. The system of claim 14, wherein the image capture device is further configured to adjust information about the zone to generate adjusted information about the zone in response to a determination that the image capture device has been relocated.

16. The system of claim 15, wherein:
the image capture device is further configured to determine that the at least one metric transgresses a threshold value; and
the customer computing device is further configured to render the adjusted information in the customer interface for approval in response to determining that the at least one metric transgresses the threshold value.

17. The system of claim 9, wherein the at least one data center environment computing device is further configured to determine a score with reference to the customer zone.

18. The system of claim 9, wherein at least one of the customer computing device, the at least one data center environment computing device, the monitoring center computing device, or the image capture device is configured to identify the one or more objects as being immobile using semantic segmentation.

19. The system of claim 9, wherein:
the image is a first image; and
the at least one data center environment computing device is further configured to:
receive a second image illustrative of the field of view of the image capture device,
identify the one or more objects within the second image, and
calculate at least one metric that indicates an amount of change between the first image and the second image with reference to at least one of the customer zone and the one or more objects.

20. The system of claim 9, wherein:
the at least one data center environment computing device is further configured to communicate, from the monitoring center to the customer computing device, the recommendation for the zone; and
the customer computing device is configured to display the recommendation for the zone after receiving the recommendation for the zone from the at least one data center environment computing device.

\* \* \* \* \*

UNITED STATES PATENT AND TRADEMARK OFFICE
CERTIFICATE OF CORRECTION

| | | |
|---|---|---|
| PATENT NO. | : 12,118,864 B2 | Page 1 of 1 |
| APPLICATION NO. | : 18/447843 | |
| DATED | : October 15, 2024 | |
| INVENTOR(S) | : Dan Sundell and Jordan Thayer | |

It is certified that error appears in the above-identified patent and that said Letters Patent is hereby corrected as shown below:

In the Claims

In Claim 1, Column 37, Line 50, delete "customer interface".

Signed and Sealed this
Twenty-sixth Day of November, 2024

Katherine Kelly Vidal
*Director of the United States Patent and Trademark Office*